US009350404B2

(12) United States Patent
Adnani et al.

(10) Patent No.: US 9,350,404 B2
(45) Date of Patent: May 24, 2016

(54) DUAL MODE RADIO FREQUENCY RECEIVERS FOR WIDEBAND SIGNAL PROCESSING

(71) Applicant: ThinkRF Corporation, Ottawa (CA)

(72) Inventors: Nikhil Adnani, Ottawa (CA); Tim Hember, Ottawa (CA); Gilbert Brunette, Ottawa (CA)

(73) Assignee: THINKRF CORPORATION, Kanata (CA)

( * ) Notice: Subject to any disclaimer, the term of this patent is extended or adjusted under 35 U.S.C. 154(b) by 93 days.

(21) Appl. No.: 14/305,308

(22) Filed: Jun. 16, 2014

(65) Prior Publication Data
US 2014/0378079 A1 Dec. 25, 2014

Related U.S. Application Data

(60) Provisional application No. 61/837,672, filed on Jun. 21, 2013.

(51) Int. Cl.
*H04B 1/16* (2006.01)

(52) U.S. Cl.
CPC .................................. *H04B 1/16* (2013.01)

(58) Field of Classification Search
USPC ........... 455/132, 133, 137, 140, 181.1, 189.1, 455/190.1, 256, 323, 324, 325, 333, 334
See application file for complete search history.

(56) References Cited

U.S. PATENT DOCUMENTS

| 4,419,768 A * | 12/1983 | Yamashita | H03J 5/542 455/180.1 |
| 8,989,687 B2 * | 3/2015 | Gomez | H04B 1/0003 455/251.1 |
| 2005/0124308 A1 * | 6/2005 | Shibuya | H03G 3/3078 455/245.2 |

* cited by examiner

*Primary Examiner* — Blane J Jackson
(74) *Attorney, Agent, or Firm* — The Law Office of Michael E. Kondoudis

(57) ABSTRACT

Wireless communication is ubiquitous today with increasing deployments leading to increased interference, increasing conflicts, etc. Monitoring the wireless environment is therefore important for regulators, service providers, Government agencies, enterprises etc. Such monitoring should be flexible both in networks monitored within the wireless environment as well as detecting unauthorized transmitters, allowing dynamic network management, etc. However, such real time spectral/signal analysis in the prior art requires both a wideband direct conversion receiver (DCR), for high performance, wideband, fast, programmable spectral analysis, and a super heterodyne receiver for fast, narrowband, programmable demodulation for signal analysis. According to embodiments of the invention a single receiver design methodology exploiting a single RF circuit to provide superheterodyne and direct conversion receiver functionalities.

23 Claims, 11 Drawing Sheets

DUAL MODE RADIO FREQUENCY RECEIVERS FOR WIDEBAND SIGNAL PROCESSING

CROSS-REFERENCE TO RELATED APPLICATIONS

This patent application claims the benefit of priority from U.S. Provisional Patent Application U.S. 61/837,672 filed Jun. 21, 2013 entitled "Dual Mode Radio Frequency Receivers for Wideband Signal Processing" the entire contents of which are incorporated herein by reference.

FIELD OF THE INVENTION

This invention relates to RF receivers and more specifically to switchable heterodyne and direct conversion dual mode broadband front-end receivers for real-time signal analysis.

BACKGROUND OF THE INVENTION

Wireless communication is ubiquitous and deployments are growing rapidly. In 2014 the International Telecommunication Union projects that the number of mobile telephones will exceed 7.3 billion, up from 4.1 billion in 2008, with a worldwide population of approximately 7.1 billion people. By 2017, global mobile Internet users expected to send and receive approximately 10 Exabytes of mobile data each month, up from the approximately 1.6 Exabytes per month projected in 2014. Over this timeframe the average mobile network connection speed will increase from approximately 1 Mbps to approximately 4 Mbps (see for example "*Cisco Visual Networking Index: Global Mobile Data Traffic Forecast Update,* 2012-2017", February 2013). However, over the same time frame the total number of devices connected to the Internet will have grown to over 30 billion, reaching approximately 50 billion in 2020. With low cost wireless transceivers a significant portion of these will be wireless devices.

By contrast the wireless spectrum is a scarce and limited resource allocated in to many different communications and RF applications with only a few small segments for the many different communication uses associated with wireless devices by consumers and business users (see for example www.ntia.doc.gov/osmhome/allochrt.pdf). The 2008 spectrum auction in the US provides a good indication of spectrum scarcity and resulting value. The Federal Communications Commission (FCC) auctioned a relatively tiny 62 MHz segment of spectrum across the United States for a total of US$19.6B (http://wireless.fcc.gov/auctions/default.htm?job=auction_summary&id=73). Similar auctions in Germany, United Kingdom and Netherlands for a variety of 2×5 MHz, 2×10 MHz, and 2×20 MHz spectral slices at 800/900/1800/1900 MHz raising $3.6 billion, $5.1 billion, $4.7 billion. Such auctions have established average pricing of approximately $750 million/MHz in currently mature congested spectral region of 800 MHz for Long Term Evolution (LTE), and approximately $350 million/MHz and $100 million in the less mature/less deployed LTE spectral regions of 1800 MHz and 2600 MHz.

To satisfy the increasing demands for performance and throughput, wireless physical layer designs are becoming increasingly complex. In the nearly thirty years of commercial wireless networks have evolved from frequency division multiple access (FDMA, so-called 1G), through time division multiple access (TDMA, so-called 2G) for Global System for Mobile Communications (GSM) systems in the 1990s followed by code division multiple access (CDMA, so-called 3G) in the early 2000s. Today, so-called fourth-generation (4G) LTE and WiMAX and next generation wireless local area network (LAN) IEEE 802.11n systems exploit Multiple-Input-Multiple-Output (MIMO) antennae, orthogonal frequency division multiple access (OFDMA), frequency hopping, complex modulation and packet-based transmission formats and advanced error correction. These wireless systems are complex to deploy, operate, maintain and monitor to support a wide variety of delay-sensitive and delay-insensitive traffic including voice, data, streaming audio, and streaming video.

Wireless communications are sensitive to, and increasingly subjected to, radio interference. As the density of wireless devices increases and the supported datarates increase so does the density of wireless base stations and bandwidth per user. Simultaneously corporations, municipalities, individuals are increasingly deploying or expanding wireless networks for a wide variety of applications from security applications, personal-local area networks (PANs/LANs), equipment communications and control, etc. Wireless 802.11 LANs occupy the same spectrum as Bluetooth, cordless phones and microwave ovens and "must accept any interference" (en.wikipedia.org/wiki/ISM_band). In addition to these sources of unintentional interference there is the issue of RF devices transmitting with malicious intent and the requirement in some environments for real-time radio jamming of transmitter signals.

The rapid growth of deployments, scarcity of spectrum, complexity of solutions, congestion and interference are increasingly compounded problems for those deploying, managing, maintaining and monitoring wireless services. The wireless spectrum is a shared resource where globally national governments not only license the use of the spectrum but must also police that spectrum. Policing ensures that those who are not authorized are not transmitting and those who have spent hundreds or thousands of millions of dollars licensing portions of the spectrum have unencumbered access to those portions. Specifically, government agencies monitor the wireless spectrum within their countries to determine the occupancy within specific segments of the spectrum, to enforce allocation, to police issues pertaining to interference, and for a variety of other legal and strategic objectives. Consequently this results in either the requirement to maintain and deploy expensive personnel and equipment to continually or periodically monitor wireless activity within a network or environment or a decision to not monitor and police the wireless spectrum. Accordingly it would be beneficial for a wide bandwidth, real-time spectrum analyzer to be provided supporting applications across geographically distributed and localized networks allowing enforcement and monitoring of regulated, sensitive, and/or problematic wireless environments. FIG. 1A depicts the 300 MHz-3 GHz region of wireless spectrum in the continental US as licensed by the FCC showing the large number of small frequency band licensed, e.g. 2345 MHz-2360 MHz, and in many instance multiple licensed uses for such a frequency band, e.g. radiolocation, mobile, fixed, broadcast satellite, and amateur.

In many frequency bands characteristics of transmitters, e.g. power, center frequency, 1 dB bandwidth, roll-off rate, etc. may be unregulated within a 100 MHz band, e.g. Industrial, Scientific and Medical band 2450±50 MHz, whereas in others, e.g. GSM 900 MHz band 124 channels are defined upon a 200 kHz frequency grid with strict limits on power, center frequency, 1 dB bandwidth, roll-off rate, etc. Accordingly, service providers and regulatory authorities are challenged by the compounding problems of increased number and density of users, increased user usage, and increased bandwidth/datarate demands. Deployment, operation and maintenance of next generation wireless services therefore results in increasing demand for test, monitoring and "visibility" of the wireless physical layer without requiring the similar deployment of large number of expensive personnel and/or equipment to at best accomplish intermittent and often inadequate monitoring.

In addition to ensuring wireless connectivity, preventing wireless connectivity has also become an issue. A growing segment of large corporate and government departments for example require the enforcement of a no-wireless policy. A no-wireless policy may be intended to prevent for example the inadvertent or malicious acquisition of sensitive, proprietary, confidential or secret information or to prevent triggering of an undesired incident, e.g. triggering of a chemical release. Such policy enforcement is challenged by the breadth and complexity of wireless devices, which are evolving rapidly in terms of functionality, complexity and performance. Applications for spectrum monitoring also extend to other environments, for example the battlefield wherein equipping military personnel and/or equipment with the means to monitor and analyze their RF environment for communication activity, signal jammers and other threats is becoming a necessity in today's world of ubiquitous wireless devices, improvised explosive devices with remote triggers, etc.

Today, these varying regulatory, service provider, military, and corporate groups must either deploy bulky broadband spectrum analyzers that are expensive, not designed for remote interconnected deployment and centralized management, and not designed for real-time analysis of wireless signals or exploit compact hand-held spectrum/signal analyzers targeted to specific narrowband system requirement. Neither solution addresses the requirement for compact, low cost, wide bandwidth, real-time spectrum analyzers that can be deployed in volume across geographic regions, providing analysis of signals that in many instances are characterized by short duration, varying frequency through frequency hopping, arbitrary frequencies, intermittent operation, and which may arise in-band or out-of-band with the normal environment of other wireless signals operating according to multiple protocols, often with high density. Accordingly, such compact, low cost, wide bandwidth, real-time spectrum analyzers would include, but not be limited to, real-time distributed spectrum analysis, interference detection, no-wireless or selective-wireless policy enforcement, spectrum management, signals intelligence (SIGINT), communications intelligence (COMINT), electronic intelligence (ELINT) and signal/interference analysis.

Further, it would be evident that it would be beneficial for such a compact, low cost, wide bandwidth, real-time spectrum analyzers to provide both the option for high performance, wideband, fast, programmable wide frequency range operation and fast, high performance, narrowband, programmable predetermined narrow frequency range. As noted supra wireless-RF communications and other microwave applications range within the United States are covered by FCC regulations up to 300 GHz across a wide range of applications and systems (see http://www.ntia.doc.gov/osmhome/allochrt.html for allocations) whilst at the same time tens of millions of mobile consumer devices are operating within approximately 120 channels within a 25 MHz region. Accordingly, although within this document for discussion purposes, and by way of illustration, a RF receiver supporting these conflicting requirements with a frequency range from 0.0001 GHz (100 kHz) to 18 GHz is presented it would be evident to one skilled in the art that other frequency ranges may be addressed without departing from the scope of the invention.

Within the prior art high performance, wideband, fast, programmable wide frequency range operation for spectrum analysis has been supported by large RF test equipment, from companies such as Agilent, Tektronix, Anritsu, Ando, etc. typically costing $10,000 at the low end to $35,000 or more at the upper end. Such instruments exploit scanning RF receivers based upon super-heterodyne (SUPHET) techniques that are well known in the prior art wherein the received RF signal (RF) is mixed with a local oscillator (LO), i.e. heterodyned, converted to an intermediate frequency (IF) and processed.

In contrast fast, narrowband, programmable predetermined narrow frequency range spectrum analysis has been supported by smaller handheld test equipment from companies such as Fluke, Berkeley, and Agilent for example. Such instruments exploit direct-conversion receivers (DCR) as known within the prior art that are much simpler to implement in integrated circuit form than SUPHET receivers. In DCR the RF band of interest is translated down to the baseband in only one conversion and whilst shortcomings including DC and I/Q offsets within the baseband output arise in wide bandwidth applications these disadvantages are limited within constant frequency type applications such as found in high volume consumer device communications such as Bluetooth (IEEE 802.15), LTE, and Wi-Fi (IEEE 802.11). DCR is also known as a homodyne receiver. Further, such applications typically require pre-determined signal analysis or operate without spectral analysis at all. For example the Fluke AirCheck™ Wi-Fi Tester for IEEE 802.11a/b/g/n networks provides signal monitoring across Channels 1-14 in the 2.4 GHz band (2412-2484 MHz) but only Channels 34, 36, 38, 40, 42, 44, 46, 48, 52, 56, 60, 100, 104, 108, 112, 116, 120, 124, 128, 132, 136, 140, 149, 153, 157, 161, 165 in the 5 GHz Band (5170-5320 MHz, 5500-5700 MHz, and 5745-5825 MHz). However, it is compact, lightweight, and only costs $2,000.

Accordingly, it would be beneficial for a single wideband receiver within a spectrum analysis instrument to support the DCR approach for high performance, wideband, fast, programmable frequency range spectral analysis and the SUPHET approach for fast, narrowband, programmable spectral analysis. The inventors according to embodiments of the invention have established a receiver design methodology wherein a single common RF circuit provides SUPHET receiver functionality wherein a single mixer is active within a predetermined portion of the common RF circuit and DCR receiver functionality when both mixers are active within the predetermined portion of the common RF circuit.

In common with most signal processing electronics there are competing tradeoffs between instantaneous bandwidth (IBW), real-time processing and operating frequency range (for example 0.0001-18 GHz) as well as all of these against cost. Typically within a Real Time Spectrum Analyser (RTSA) the operating frequency range primarily determined by factors such as RF amplifier design, filter design and semiconductor technologies whilst the processing speed and IBW are determined through a combination of the RF frontend, analog-to-digital converters (ADCs), digital processing (such as Fast Fourier Transform (FFT) for example), etc. Hence, trading off these competing performance goals and cost is impacted by both analog and digital portions of the RTSA. Traditional SUPHET spectrum analysers are implemented within the prior art by using custom application specific integrated circuits (ASICs) for the analog portions and high speed field programmable gate arrays (FPGAs) for the digital portion. These ASICs and FPGAs typically being built utilizing the highest performance integrated circuit (IC) design and manufacturing processes available. Accordingly, a SUPHET RTSA is essentially built using different manufacturing processes and circuit designs to the transceiver circuits that broadcast the RF signals it is designed to monitor. This is very different from spectrum and protocol analysers addressing specific telecommunications standards that can typically leverage the same ASICs and other circuit elements of devices operating according to those standards, such as cellphones, smartphones, PDAs, etc.

High speed FPGAs and custom ASICs are expensive and in some instances difficult to utilize. In high volume consumer applications such as Wi-Fi (IEEE 802.11), WiMAX (IEEE 802.16) and Bluetooth the transmitter circuits and receiver circuits are typically implemented with silicon based digital IC designs and processes whereas the RTSA is optimized towards to both digital and analog aspects for high performance measurement applications wherein it is beneficial to leverage new IC design processes optimized to aspects such as faster computational processing, improved serial data links, etc. as well as RF circuit integration rather than accepting performance tradeoffs, whilst meeting a wireless specification, in order to provide monolithic integration and exploit lower cost IC processes.

Accordingly as discussed supra and below in respect of FIGS. 1B and 1C respectively prior art spectrum/signal analysis techniques have been distinctly separated between those addressing broadband analysis using swept oscillator mixing and those addressing narrowband analysis within narrow frequency ranges established by wireless standards, typically via DCR. An alternative prior art approach, described below in respect of FIGS. 3 and 4 by the inventors, see N. Adnani et al in US Patent Application 2013/0,064,328 entitled "Radio Frequency Receiver System for Wideband Signal Processing," exploits a RF receiver operated as a DCR over a limited frequency range and in order to process signals outside of the range of this DCR, these other signals were processed by either downconverter or upconverter circuits to bring the signal into the range where it could be processed by the DCR. However, whilst this receiver allows for wideband operation across the entire operating frequency range, it relies upon an IQ demodulator for conversion of the signal directly to baseband (zero IF). However, this IQ demodulator, subsequent baseband operational amplifiers and the dual-ADCs digitizing the I and Q signals require DC and IQ offset compensation. Such compensations are difficult to determine and apply in real-time such that methods of generating/applying offset correction would introduce latency into the signal processing chain which in turn would impact signal streaming rates and consequently demodulation bandwidth. Accordingly, whilst providing fast wideband scans and signal detection such a RF receiver is not suitable in other situations requiring wideband signal demodulation.

Accordingly, it would be beneficial for RF receivers with such spectrum analysis/signal analysis applications to overcome these limitations with a true hybrid architecture wherein a DCR may be used to scan a frequency band or a subset of a frequency band, e.g. from 3 GHz to 10 GHz. However, where a signal is detected, say at 4.5 GHz having bandwidth of 20 MHz, then the RF receiver can switch to SUPHET mode in order to enable processing of RF signals up to half the bandwidth of the DCR. Beneficially such SUPHET processing in this mode may therefore be performed without offset correction and therefore the latencies within the prior art RF receiver methodology removed or reduced.

Accordingly, it would be beneficial for embodiments of the invention implementing a dual SUPHET-DCR mode wideband receiver to similarly leverage high volume silicon based digital IC designs and processes where feasible and minimize requirements for higher cost ASICs and FPGAs. Accordingly, the dual SUPHET-DCR mode wideband receiver can satisfy the conflicting requirements of low-cost, high speed, wide IBW, large operating frequency range, and high sensitivity with field-deployable network interfaced modules. Accordingly, based upon embodiments of the invention, the inventors have established a dual SUPHET-DCR mode wideband receiver based RTSA allowing distributed analysis wherein determination of policy breaches, network performance, regulatory compliance, etc. are locally determined and exploited directly in network management or communicated to the central server and network administrators for subsequent action. Beneficially the RTSA according to embodiments of the invention provides for a scalable architecture wherein multiple RTSA modules may be synchronized providing enhanced spectral bandwidth, processing speed, and monitoring.

However, it would be apparent that such a hybrid receiver providing low-cost, high speed, wide IBW, large operating frequency range, and high sensitivity would have a wide range of applications including, but not limited to, spectrum analysers, protocol receivers, frequency agile receivers and transponders, network management, and EMC testing. It would further be evident that the deployment context of devices employing such hybrid receivers may include, but not be limited to, laboratory environments, remote stand-alone deployments, integration or deployment with other network infrastructure, hand-held or field-test deployments, as well as part of other civilian, Governmental and military systems and platforms.

SUMMARY OF THE INVENTION

It is an object of the present invention to obviate or mitigate at least one disadvantage of the prior art.

In accordance with an embodiment of the invention there is provided a device comprising:

a first filter characterised by a first frequency characteristic;

a second filter characterised by a second frequency characteristic;

an RF processing circuit for receiving RF signals within a frequency range compatible with the first and second frequency characteristics and processing said received RF signals to generate a processed RF output signal;

a programmable quadrature demodulator block coupled to the RF processing circuit comprising a first mixer receiving a local oscillator signal, a second mixer receiving the local oscillator signal with a predetermined phase offset, the programmable quadrature demodulator block operating in a first mode and a second mode wherein the first mode comprises coupling the processed RF output signal to both first and second mixers and generating first and second outputs representing in-phase and quadrature components of the processed RF output signal; and the second mode comprises coupling the processed RF output signal to only the first mixer, generating a down converted signal in dependence upon the processed RF signal and the local oscillator signal, and selectively blocking output from the second mixer.

In accordance with an embodiment of the invention there is provided a method comprising processing a received RF signal using an electronic circuit to generate an output signal, the output signal being generated in dependence of a heterodyne process when the electronic circuit is configured in a first mode and in dependence of a homodyne process when the electronic circuit is configured in a second mode.

In accordance with an embodiment of the invention there is provided a device comprising a single RF receiver block supporting both superheterodyne and direct down conversion receiver functionality.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to RF receivers and more specifically to broadband receivers for real-time signal analysis.

Figure 1A:
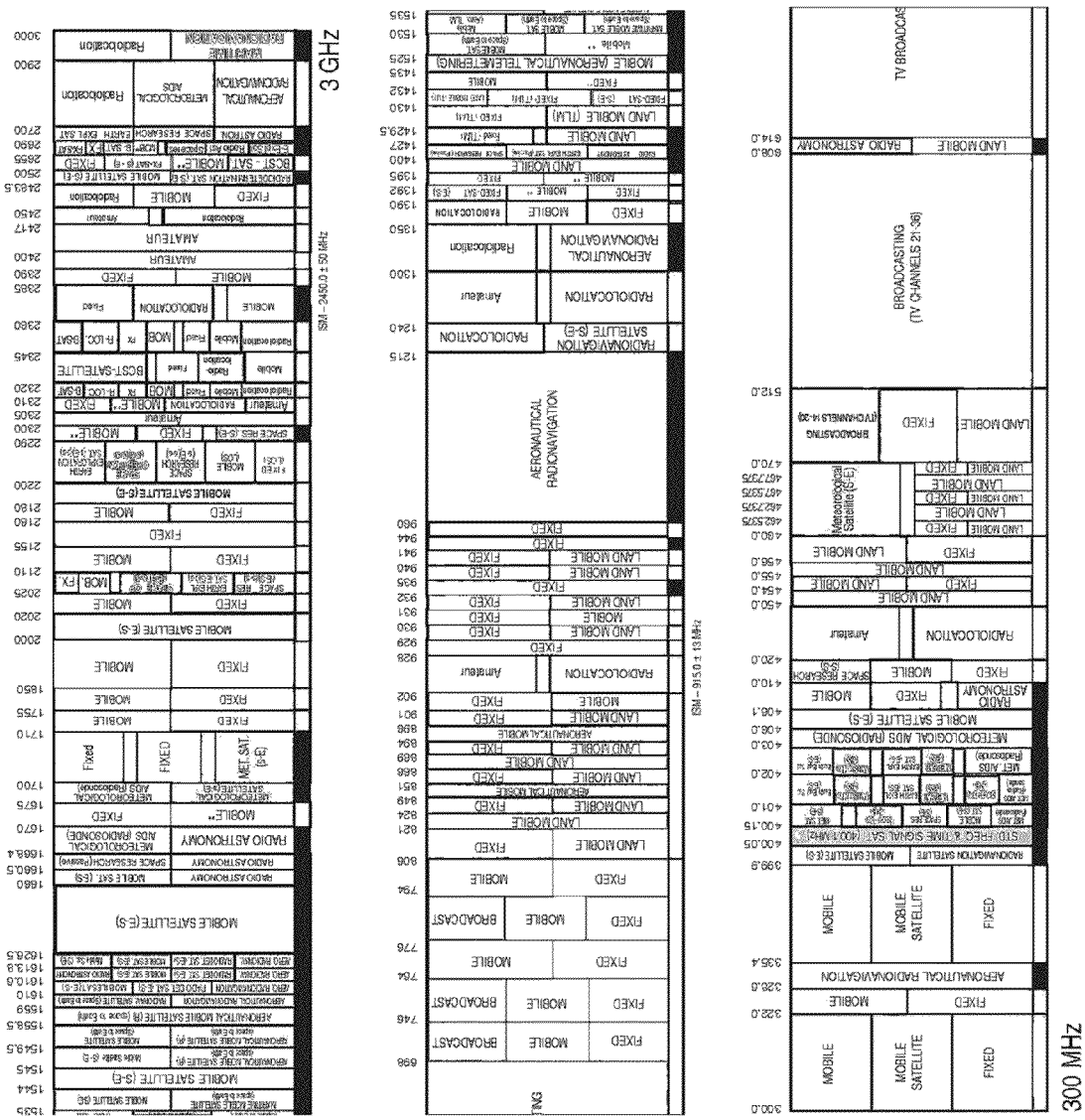
FIG. 1A depicts schematically the 300 MHz-3 GHz RF spectrum as licensed by the Federal Communications Commission.
Figure 1B:
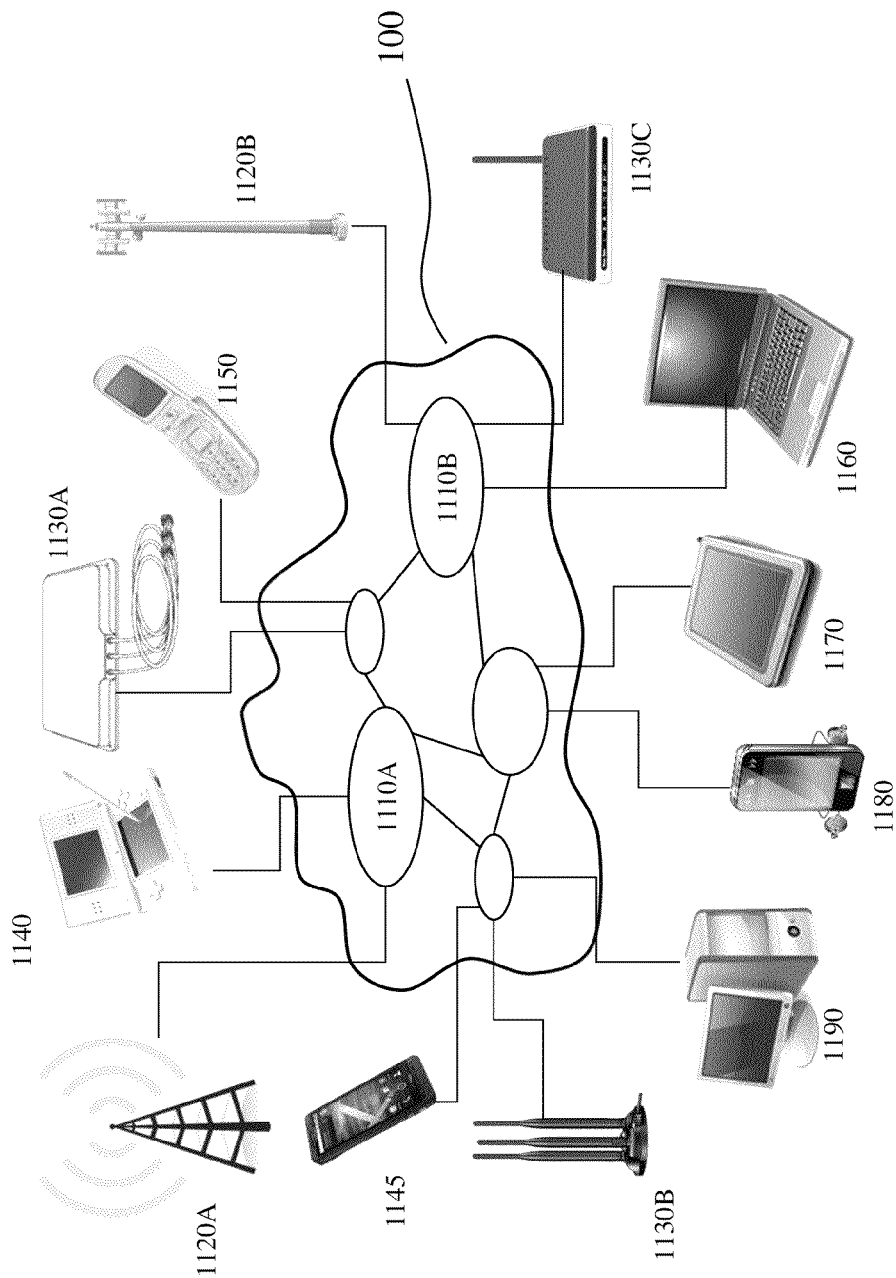
FIG. 1B depicts a network accessed by wireless devices.

FIG. 1B depicts a network 100 accessed by a plurality of wireless devices. The network 100 may be formed from a plurality of sub-networks, of which first and second sub-networks 1110A and 1110B are identified. First sub-network 1110A may for example be a transport network associated with a service provider wherein the primary communications are provided through a first telecommunications standard, such as GSM for example, relating to cellular networks. Second sub-network 1110B may for example be associated with Internet Protocol (IP) traffic according to a second telecommunications standard, e.g. Internet Protocol v6. Network 100 may therefore be formed from a combination of wired and wireless infrastructure that provides a wireless interface for wireless devices according to one or more standards. For example, first sub-network 1110A being GSM based incorporates cellular base stations such as tower 120A and 120B, whilst second sub-network 1110B being Internet based incorporates access points such as wall mounted MIMO antenna 1130A, free standing MIMO antenna 1130B, and Internet router 1130C. Accessing the network 100 through this infrastructure as well as other methods not presented are wireless devices including for example, but not limited to, portable gaming console 1140, smartphone 1145, cellular phone 1150, laptop computer 1160, tablet PC 1170, portable multimedia player 1180 and desktop PC 1190.

Accordingly, network 100 may operate according to one or more telecommunication standards including but not limited to IEEE 802.11 (WLAN, Wi-Fi), IEEE 802.15 (PAN), IEEE 802.16 (WiMAX), IEEE 802.20 (MBWA), Universal Mobile Telecommunications System (UMTS), Global System for Mobile Communications (GSM) 850, GSM 900, GSM 1800, GSM 1900, General Packet Radio Service (GPRS), Industrial, Scientific and Medical (ISM) bands regulated by ITU-R 5.138, ITU-R 5.150, ITU-R 5.280, and IMT-2000 (International Mobile Telecommunications-2000). Some standards include multiple internal standards such as IEEE 802.11 which includes IEEE 802.11A, IEEE 802.11B, IEEE 802.11G, and IEEE 802.11N. As such a wireless device may receive signals according to multiple internal standards of a single wireless standard. Other wireless devices may support multiple wireless standards such as, for example, a laptop computer 1160 may support IEEE 802.11, IEEE 802.15 and IEEE 802.16 standards.

Figure 1C:
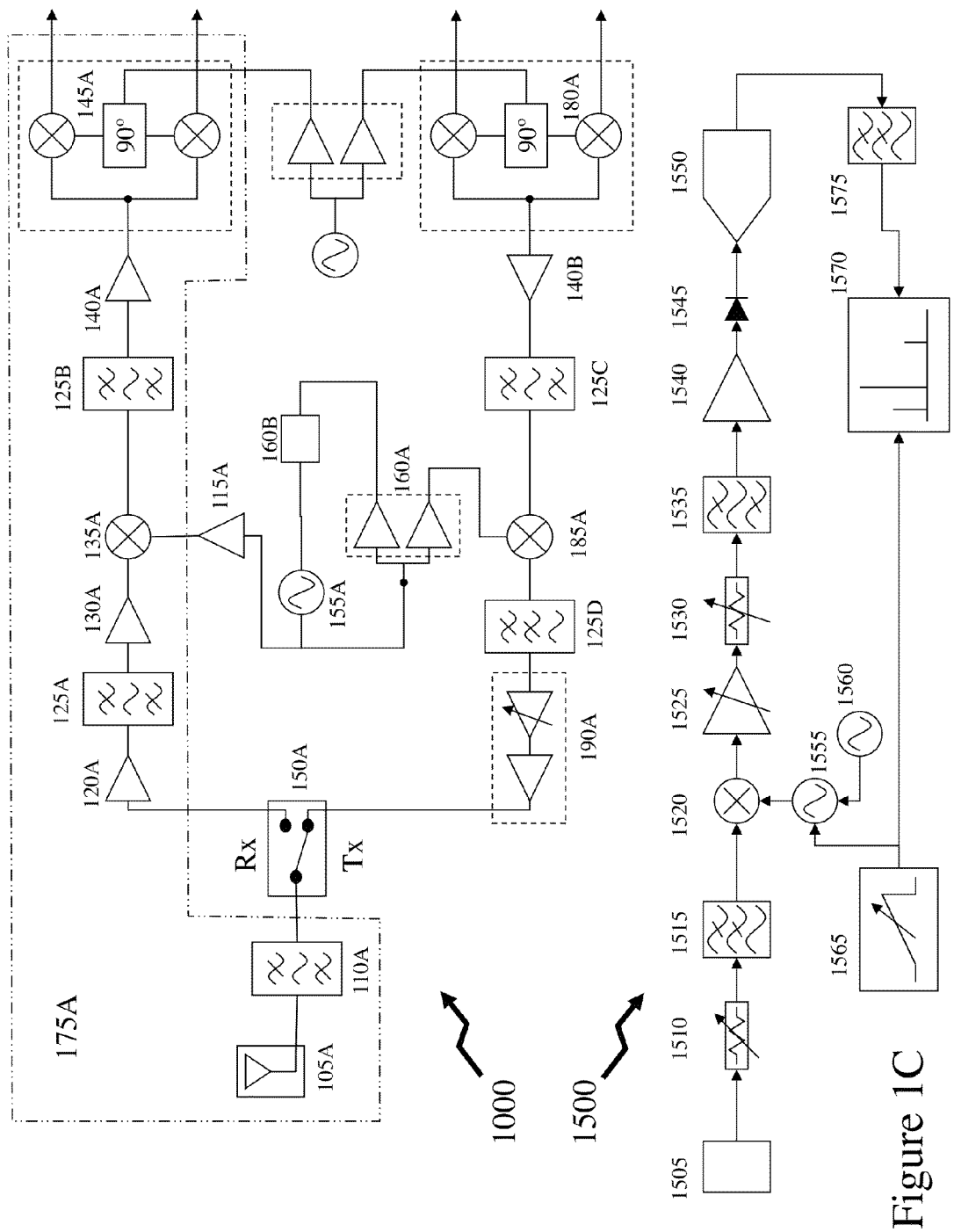
FIG. 1C depicts a transceiver within a wireless device accessing a wireless network and a classic super-heterodyne receiver according to the prior art.

Now referring to FIG. 1C there is depicted a typical transceiver 1000 according to the prior art within a wireless device accessing a wireless network such as network 100 above. The transceiver 1000 comprises an antenna 105A wherein RF signals to/from the antenna 105A couple from/to Receive-Transmit (RxTx) Switch 115A are filtered by filter 110A. Considering the receiver side of the transceiver then the received RF signal is coupled from the RxTx Switch 115A to a low noise amplifier (LNA) 120A, then through receive filter 125A, and first wideband gain block (WGB) 130A to down-converter 135A. At down-converter 135A the received RF signal is down converted using a local signal generated by the local oscillator 155A which is buffered prior to the downconverter 135A by buffer 115A. After down conversion to an intermediate frequency (IF) the received signal is coupled from the downconverter 135A to second filter 125B and second WGB 140A before being demodulated in I/Q demodulator 145A wherein in-phase (I) and quadrature (Q) signals are generated by a second mixing stage.

On the transmit side the signal to be transmitted is coupled as I and Q signals to an I/Q modulator 180A wherein the combined signal is then coupled via third WGB 140B to third filter 125C before being up-converted by up-converter 185A. The up-converted RF signal is then coupled via transmit filter 125D to a power amplifier 190A and then coupled to the antenna 105A via RxTx Switch 115A and filter 110. Accordingly the operation of the transceiver 1000 is driven by a clock synchronized to the network such that the device transmits within one timeslot and receives within another timeslot. Whilst the receive path of the transceiver 1000 comprises filter 110A and receive filter 125A any RF signals within the bandwidth of these filters is coupled through the RF chain and impacts the performance of the link between this transceiver 1000 and another device.

The in-band interfering signals may come from in-band transmissions of other devices operating according to the same standard as transceiver 1000, regulated devices operating in adjacent frequency bands where transmit frequency sidelobes coincide with the passband of filter 110A and receive filter 125, and unregulated devices in the same band or another passband. The local oscillator 155A coupled to the downconverter 135A via gain stage 160A and up-converter 185A operates in a phased lock loop with PLL 160B.

Also depicted in FIG. 1C is classic super-heterodyne receiver (SUPHET Rx) 1500 according to the prior art. Accordingly an input signal, received from a source 1505 passes through an attenuator 1510 and a low-pass filter 1515 to a mixer 1520. In mixer 1520 this filtered, attenuated signal is mixed with a signal from a local oscillator (LO) 1555. Because the mixer is a non-linear device, its output includes not only the two original signals, but also their harmonics and the sums and differences of the original frequencies and their harmonics. If any of the mixed signals fall within the passband of the intermediate-frequency (IF') filter 1535 after passing through variable gain stage 1525 and another variable attenuator 1530 it is further processed, for example amplified again with amplifier 1540, and input to an envelope detector 1545, digitized via ADC 1550 and displayed on display 1570. The digitized signals may be further filtered with digital filter 1575. A ramp generator 1565 generates a control signal that creates the horizontal movement across the display 1570 from left to right. This ramp signal also tunes the LO 1555 so that its frequency change is in proportion to the ramp signal, where the LO 1555 is driven from a reference oscillator 1560. Such a classic SUPHET Rx 1500 provides the basis for traditional RTSAs such as described supra which are typically laboratory and/or rack mounted designs.

Within the prior art alternatives to SUPHET receivers and RTSAs include F. LaMarche et al in U.S. Pat. No. 7,957,938 entitled "Method and Apparatus for a High Bandwidth Oscilloscope utilizing Multiple Channel Digital Bandwidth Interleaving" and J. Earls et al in US Patent Application 2005/0, 207,512 entitled "Multi-Channel Simultaneous Real-Time Spectrum Analysis with Offset Frequency Trigger." In respect of receivers exploiting SUPERHET and DCR circuits Dong et al. in US Patent Application 2010/0,304,703 entitled "Multiple Frequency Band Hybrid Receiver" teaches to a SUPHET Rx for an upper 5 GHz band and a DCR based receiver (DCR Rx) for a lower 2.4 GHz band. Similarly Diener et al in U.S. Pat. No. 7,142,108 entitled "System and Method for Monitoring and Enforcing a Restricted Wireless Zone" and U.S. Pat. No. 7,184,777 entitled "Server and Multiple Sensor System for Monitoring Activity within a Shared Radio Frequency Band" teach to remote spectrum analysis upon narrowband predetermined frequency bands, e.g. 2400-2483 MHz and 5725-5825 MHz employing a spectrum analysis engine (referred to as SAGE) in combination with FFT processing using multiple FFT intervals to determine power versus frequency and characterize pulsed signals.

The SAGE being described by G. L. Sugar et al in U.S. Pat. Nos. 6,714,605 and 7,224,752 entitled "System and Method for Real-Time Spectrum Analysis in a Communication Device"; U.S. Pat. No. 7,254,191 entitled "System and Method for Real-Time Spectrum Analysis in a Radio Device"; and D. Kloper et al in U.S. Pat. No. 7,606,335 entitled "Signal Pulse Detection Scheme for Use in Real-Time Spectrum Analysis." However, the SAGE is a post-processing environment independent of the design of the RF front-end except for adjusting the gain of the RF front-end such that the maximum signal received in the last T seconds (for example 1 second) is 6 dB below the full-scale of the analog-to-digital converter (ADC) within the RF interface.

Figure 2:
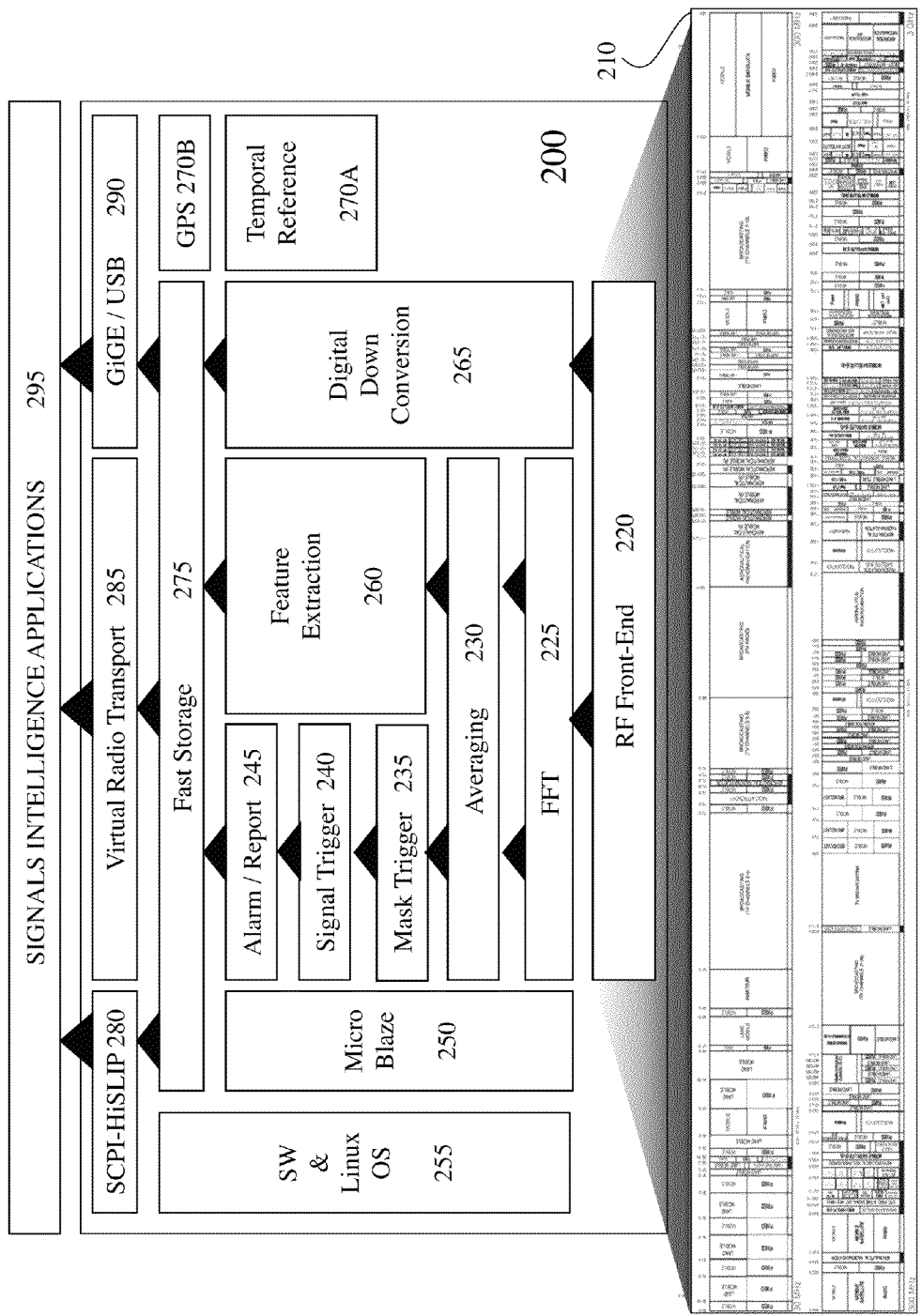
FIG. 2 depicts a real time spectrum analyzer according to an embodiment of the invention.

Now referring to FIG. 2 there is depicted a RTSA 600 according to the inventors developed previously to balance the conflicting requirements of low-cost, high speed, wide IBW, large operating frequency range, and high sensitivity with low cost field-deployable network interfaced module. N. Adnani et al in US Patent Application 2013/0,064,328 entitled "Radio Frequency Receiver System for Wideband Signal Processing" combining an RF Front End 220 and Digital Down Conversion (DDC) 265. As depicted in FIG. 2 Spectrum 10 depicts the regulated wireless environment between 300 MHz and 3 GHz (upper band) and 3 GHz to 30 GHz (lower band) (see *US Department of Commerce, National Telecommunications and Information Administration Office of Spectrum Management*, http://www.ntia.doc.gov/files/ntia/publications/spectrum_wall_chart_aug2011.pdf). This RF spectrum is received by an RF Front End 220 wherein it is processed to generate in-phase (I) and quadrature (Q) baseband signals and converted to digital format. For example the RF Front End 220 may operate from 0.1 MHz to 8 GHz with a resolution bandwidth of 10 kHz providing performance, sensitivity and spurious free dynamic range comparable to high end laboratory spectrum analyzers.

Digitization of the down converted RF signals is provided by the ADC supporting 125 MSPS with 12-bit accuracy for example. The digitized baseband signals are coupled to both the FFT 225 and DDC 265 so as to allow real-time execution of both a Fast Fourier Transform (FFT) with a hardware based real-time FFT for extraction of frequency domain information and the real-time down conversion and decimation of the signal to extract channel data and/or characteristics.

The RF Front End 220 provides for example a 100 MHz wide instantaneous bandwidth allowing the RTSA 200 to monitor entire communication bands at once whilst the center frequency of instantaneous bandwidth may be moved to scan the spectrum at a rate of more than 200 GHz per second such that the 8 GHz bandwidth of the RF front-end 220 may be scanned every 40 ms. This rate allowing for both the settling time at each frequency step and a dwell time that allows for more than 25,000 samples to be taken at each step. The scanning of the RTSA 200 being controlled through a user defined automatic scan list that allows each RTSA to be configured to scan a list of up to 1024 center frequencies thereby enabling scans of the entire spectrum, or specific frequencies, or where ever and how ever the user wants. Further for each center frequency, the user may also define other RTSA 200 settings including but not limited to antenna selection (where multiple antennas are available), gain election for the RF Front End 220, dwell time, averaging, DDC and channelization parameters, mask trigger, signal triggers, and alarm conditions.

The down-converted and decimated signal, channelized signal, from the DDC 265 block is then coupled to a high speed memory, Fast Storage 275, for storage wherein it may be subsequently discarded, processed further, or transmitted from the RTSA 200 to a remote management server for analysis. The output of the FFT 225 is forwarded to an averaging circuit 230 wherein the data is then forwarded to two paths of processing. The first path being a sophisticated and efficient signal triggering mechanism for capturing and discerning signals-of-interest (SOIs) in real-time through mask trigger 235, signal trigger 240, and alarm/report 245 circuits wherein the alarms and reports are stored within the high speed memory 275.

The signal triggers, feature extraction and alarm functions are all implemented relative to the mask triggers. Within RTSA 200 there is a unique user-definable mask trigger for each of 1024 user-defined center frequencies within the scan list, although optionally multiple mask triggers could be associated with each centre frequency. Further for each of the 1024 user-defined center frequencies within the scan list there are eight signal triggers per center frequency, providing more than 8000 user-definable triggers across the spectrum. As with the mask trigger the number of signal triggers may be varied. Each signal trigger performs an energy detection relative to the mask trigger allowing each individual signal trigger to define an expected signal frequency and bandwidth such that precise thresholds pertaining to signal rise, fall, bandwidth and power can be established thereby eliminating false negative triggers due to noise.

The second path from the averaging 240 is feature extraction 240 wherein features are extracted on signals that exceed a mask trigger. For example feature extraction 240 may note frequency, bandwidth, peak amplitude and the RMS power of the signal. Further, in order to avoid false signal detections due to noise, the feature extraction 240 only recognizes a signal if the signal exceeds a user-defined threshold of RMS power. If the transitions of a capture signal correlate with the any of the user-defined signal triggers then an association with that signal trigger is noted. If there is no correlation to any signal trigger then an "unknown" signal trigger is noted. The unknown signal trigger is for the purpose capturing and discerning anomalies.

The alarm/report 245 provides a memory and network efficient means of acting and reporting upon SOIs as they raised upon the capture of signals whether those signals are associated with signal triggers or are unknown. The alarms provide the ability to record different attributes of SOIs to memory, for example high speed memory 275, that may include the associated IQ data and/or request user-defined actions by the embedded software such as subsequent post-processing or transfer of data to a remote network server.

RTSA 200 receives control data and provides data with multiple protocols allowing flexibility in communications for remote deployments as well as those associated with network infrastructure for example. As depicted these are Standard Commands for Programmable Instruments (SCPI) is an ASCII textual standard command set for controlling instrumentation wherein High-Speed LAN Instrument Protocol (HiSLIP) is one version allowing communications over TCP/IP. Also supported is VITA 49 Radio Transport (VRT) protocol for high speed as we as Gigabit Ethernet (GiGE) and Universal Serial Bus (USB). The being provided by SCPI-HiSLIP 280, VRT 285 and GiGE/USB 290 communications blocks.

The RTSA 200 also supports transmitter geo-location by providing for example clock synchronization; time synchronization of networked RTSAs integrated GPS (GPS 270B), VRT time synchronization; accurate time-stamping (temporal reference 270A); and accurate received signal strength indicator (RSSI). Further as depicted RTSA 200 incorporates a Micro Blaze 250, which is a soft processor core implemented entirely in the general-purpose memory and logic fabric of FPGAs, and operates using software and Linux operating system hosted in SW & Linux OS 255. The RTSA 200 through the interfaces provides data to external applications such as Signals Intelligence Applications 295 which may include signal post-processing, demodulation and geo-location on the server-side through proprietary and/or third-party applications such as MATLAB.

Figure 3:
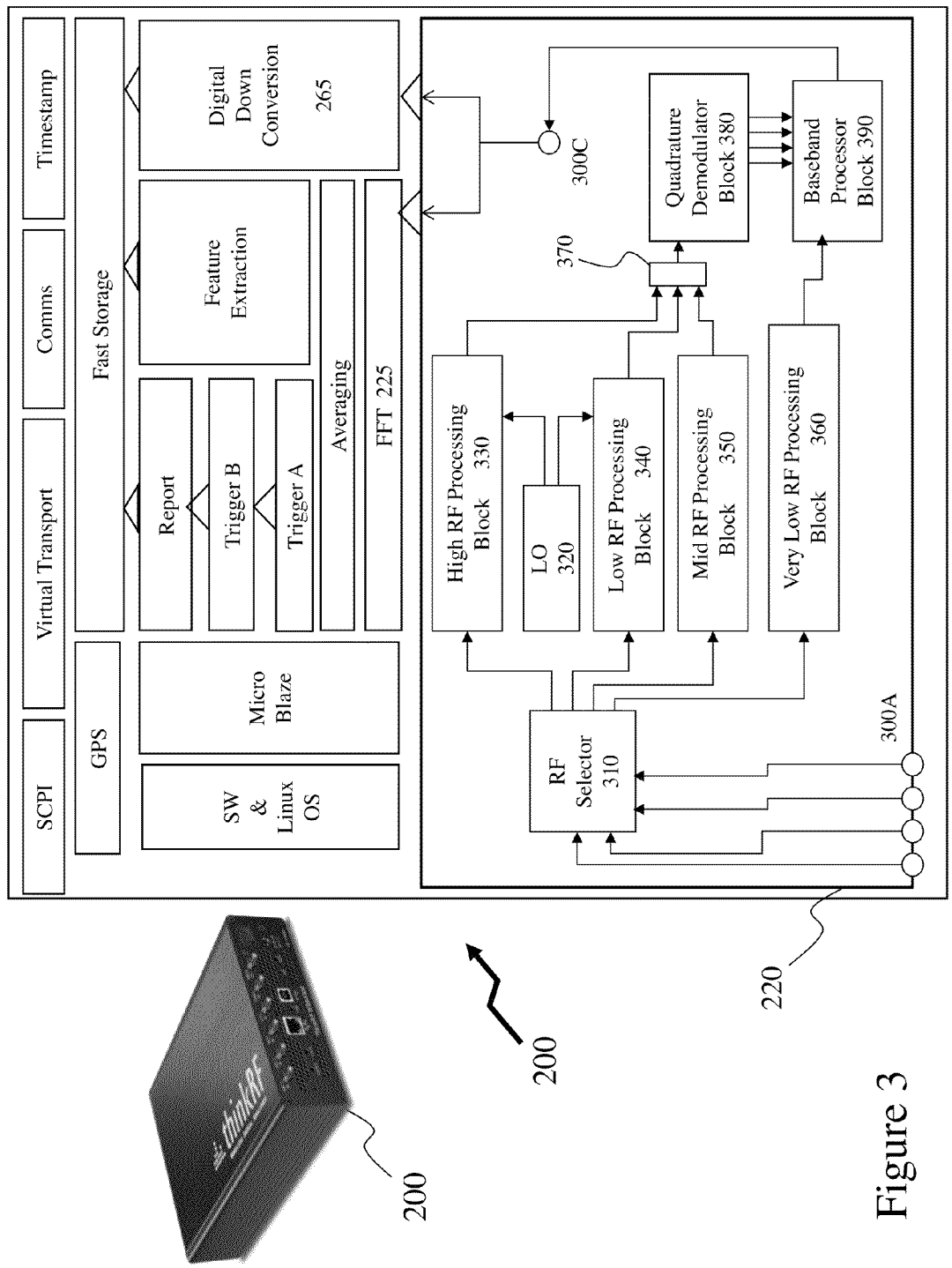
FIG. 3 depicts a RF front-end for a prior art real time spectrum analyzer.

Now referring to FIG. 3 there is depicted a RF front-end 700 for a RTSA 200 such as described supra in respect of FIG. 2. RTSA 200 having a similar structure as that described supra in respect of FIG. 2 through to network interfaces with real-time signal capture, triggering, FFT etc. RTSA 200 being a field deployable module approximately 230×165×55 mm (approximately 9"×6.5"×2.2") with SMA connectors 300A to provide the input ports for connecting the antenna. Optionally, a single connector may be provided as may connectors of other standards including SMB, SSMA, SMC, 7 mm, BNC, TNC, K, and V for example. As depicted the plurality of RF inputs 300A are coupled to an RF selector 310 which is itself coupled to a plurality of RF Processing Blocks, depicted are High RF Processing Block 330, Mid RF Processing Block 340, Low RF Processing Block 350, and Very Low RF Processing Block 360. Accordingly the RF Selector 310 dynamically manages the connections between the RF inputs 300A and the multiple RF processing blocks that are allocated to frequency ranges within the overall 0.10 MHz to 8 GHz frequency range supported by the RTSA 200 through the design of the RF front-end 200. Each of High RF Processing Block 330 and Low RF Processing Block 350 are shown coupled to Local Oscillator (LO) 320.

The processed signals from the High RF Processing Block 330, Mid RF Processing Block 350, and Low RF Processing Block 340 are coupled to Selector 370 wherein they are coupled to Quadrature Demodulator Block 380 and then Baseband Processor Block 380B, the output of which is coupled to output 300C that feeds the FFT 225 and DDC 265 portions of the RTSA 200. The processed signal from Very Low RF Processing Block 360 is coupled directly to Baseband Processor Block 390 and thence to output 300C.

High RF Processing Block 330 processes an RF input signal over a first range of frequencies by filtering, amplifying and/or attenuating it in stages and converting the center frequency of the signals under observation using at least one mixer to a range of intermediate frequencies (IFs). Similarly Low RF Processing Block 340 processes an RF input signal over a second range of frequencies by filtering, amplifying and/or attenuating it in stages and converting the center frequency of the signals under observation to a range of IFs. Signals from High RF or Low RF Processing Blocks 330 and 340 respectively are switched into the Quadrature Demodulator Block 380 to be processed. Mid RF Processing Block 350 processes an RF signal over a third range of frequencies by filtering, amplifying and/or attenuating it in stages. Accordingly, it would be evident that Quadrature Demodulator Block 380 operates as a Direct Conversion Receiver (DCR) in down-converting the IF signals from Low, Medium and High RF Processing Blocks 340, 350, and 330 respectively. Within RF Front End 220 RF signals coupled to the Low and High RF Processing Blocks 340 and 330 respectively are mixed, e.g. heterodyned, whilst signals within the band of Medium RF Processing Block 350 are subjected to signal processing but are not mixed. The output of Quadrature Demodulator Block 380 is coupled to Baseband Processor Block 390 which also receives directly signals processed by the Very Low RF Processing Block 360. Considering, RF Front End 220 operating upon RF signals between 0.10 MHz and 8 GHz then the frequency ranges for the processing circuits may for example be 3.0 GHz-8.0 GHz, 400 MHz-4.4 GHz, 40-1000 MHz and 0.1-50 MHz for the High RF Processing Block 330, Mid RF Processing Block 340, Low RF Processing Block 350, and Very Low RF Processing Block 360 respectively.

Figure 4:
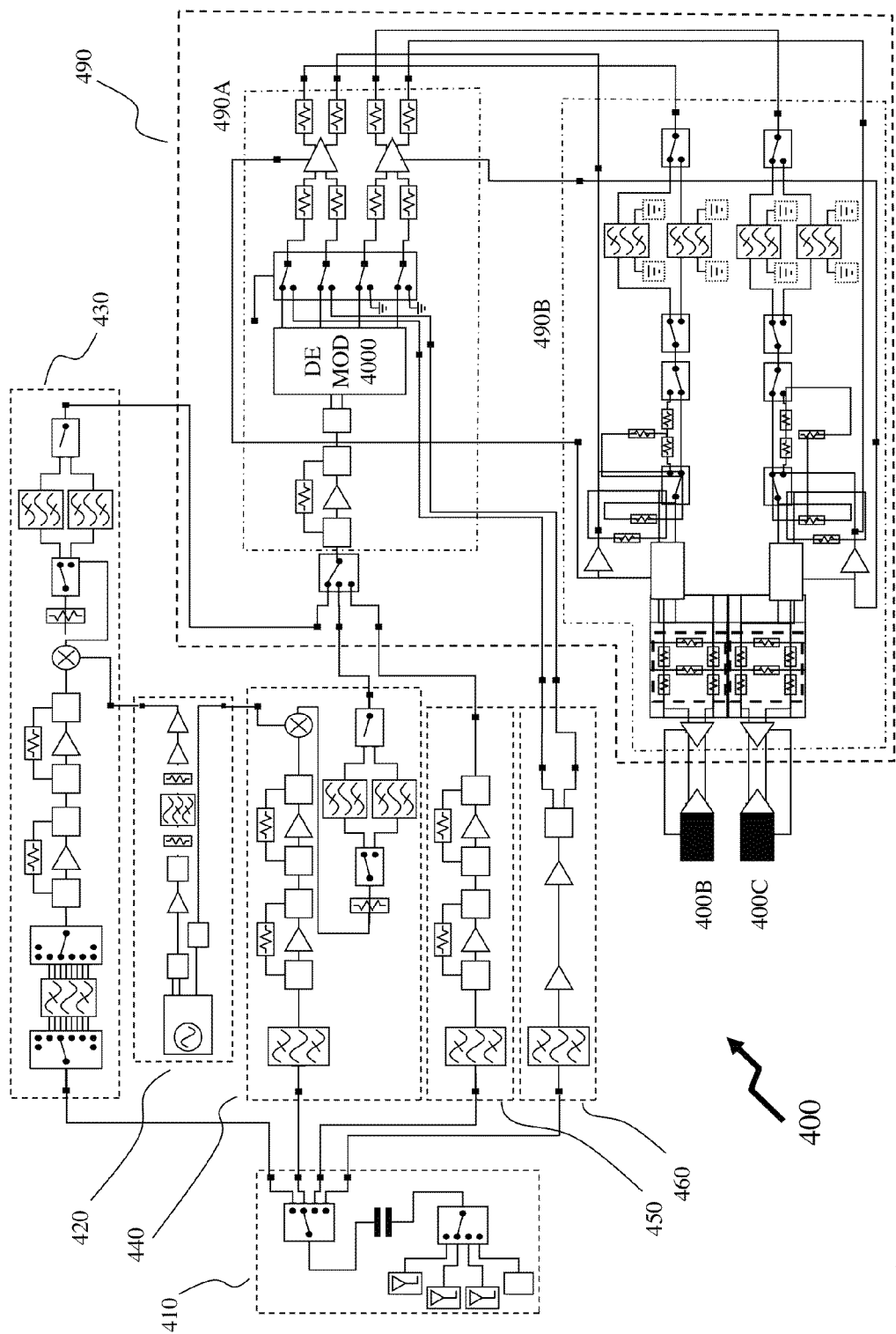
FIG. 4 depicts an RF front-end circuit for a prior art real time spectrum analyzer.

Now referring to FIG. 4 there is depicted an RF front-end circuit 400 according to the prior art of Adnani. Accordingly, RF front-end circuit 400, like RF front-end 220, an embodiment of the invention employing the circuit elements described supra in respect of FIG. 8 through 16. Accordingly there are depicted the following circuits:

RF selector circuit 410 providing the functionality of RF selector 310 in FIG. 3;

a local oscillator (LO) circuit 420 providing the functionality of LO circuit 320 in FIG. 3;

high RF circuit 430 providing the functionality of High RF Processing Block 330 and operating 3.0 GHz-8.0 GHz and fed from RF selector circuit 410;

mid RF circuit 440 providing the functionality of Mid RF Processing Block 340 and operating 400 MHz-4400 MHz and fed from RF selector circuit 410;

low RF circuit 450 providing the functionality of Low RF Processing Block 350 and operating 40-1000 MHz and fed from RF selector circuit 410;

very low RF circuit A 460 providing the functionality of Very Low RF Processing Block 360 and operating 0.1-50 MHz and fed from RF selector circuit 410; and quadrature demodulator circuit 490 comprising Quadrature Demodulator Circuit 490A providing the functionality of Quadrature Demodulator 380 and amplified filter multiplexer circuit 490B providing the functionality of Baseband Processor Block 390.

Quadrature Demodulator Circuit 490A receives the processed RF signals from high RF circuit 430, mid RF circuit 440, low RF circuit 450, very low RF circuit 460 and provides digital outputs 400B and 400C representing the analog input signals of interest to subsequent digital processing circuits, such as FFT 335 and Digital Down Conversion 365 depicted in FIG. 2 with respect to RTSA 200. As evident very low RF circuit 460 couples to Quadrature Demodulator Circuit 490A after DEMOD (I-Q Demodulator) 4000 whereas high RF circuit 430, mid RF circuit 440, and low RF circuit 450 are all processed by DEMOD 4000. Accordingly, processing of RF signals within RF Front End 220 comprises super-heterodyning and DCR, for example high RF circuit 430 super-heterodynes down the RF signals to the intermediate IF to be processed by the DCR whilst low RF circuit 450 super-heterodynes up the RF signals to the intermediate IF to be processed by the DCR. Signals within the range of mid RF circuit 440 are processed directly by the DCR as their frequencies sit within the IF range.

As discussed supra in respect of prior art RTSA devices RF signals may be processed by either SUPHET (heterodyning) or DCR to translate the RF signal back to baseband and accordingly do so by 2 or 1 steps respectively. An alternate RTSA according to prior art of the inventors exploits a serial combination of SUPHET and DCR. The DCR being performed within a Quadrature (I-Q) Demodulator, such as Quadrature Demodulator Block 380 in RF Front End 220 for example as described in respect of FIG. 3. An I-Q Demodulator operates by coupling the same Local Oscillator (LO) to a pair of Mixers which each receive the RF signal to be demodulated wherein one LO signal is phase shifted 90° for the Quadrature (Q) portion of the circuit relative to the In-Phase (I) portion. Accordingly, it would be evident to one skilled in the art that if one RF signal path only is employed then that path acts as a SUPHET to a lower IF or baseband whereas if both mixers are driven then the I-Q demodulator acts as I-Q DCR. However, it would evident that without architectural design modifications image frequencies will be similarly down converted at the same time. Accordingly, the inventors have established a filtering and partitioning methodology for a dual-mode RF receiver that may selectively operate as either a SUPHET receiver or a DCR with initial down-conversion to the LO range of the I-Q demodulator. These issues being exacerbated by the wide bandwidth of the overall RTSA rather than typical narrowband DCR applications in receivers operating to a predetermined wireless standard.

Figure 5:
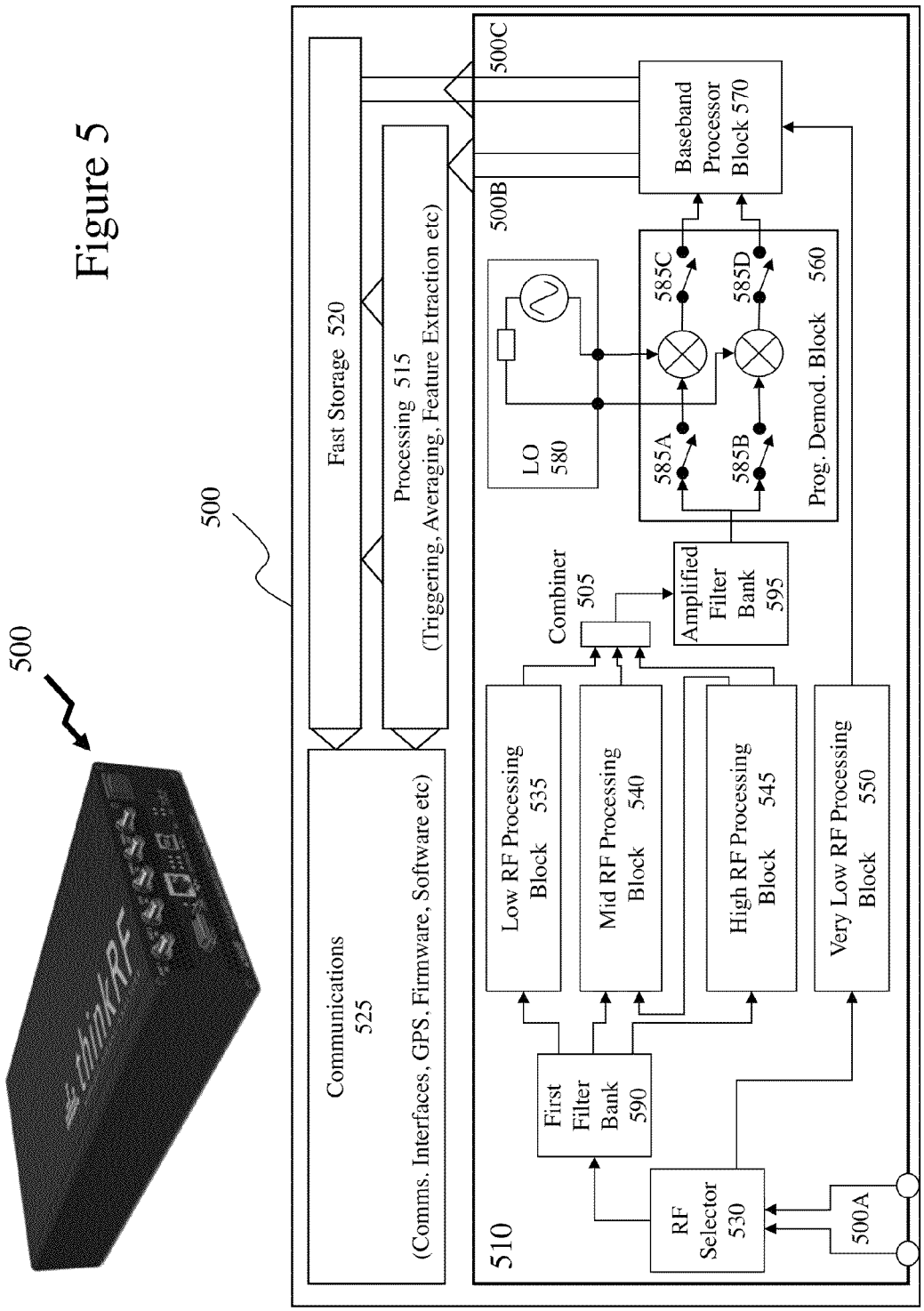
FIG. 5 depicts a real time spectrum analyzer according to an embodiment of the invention.

Now referring to FIG. 5 there is depicted an RTSA 500 according to an embodiment of the invention. RTA 500 operating from +12V power supply is approximately 250 mm×165 mm×30 mm (9.8"×6.5"×1.2"). As depicted RTSA 500 comprises a RF front-end 510 which provides processed RF signals to Fast Storage 520 and Processing 515 where these are also coupled to Communications 525 which provides network interfaces such as SCPI-HiSLIP, VRT, GiGe/USB as discussed supra in respect of RTSA 200 as well as other features such as software, firmware, Linux OS, Micro Blaze, GPS, time/data reference etc. Processing 515 provides similar functionality to many elements of RTSA 200, such as FFT, Averaging, Feature Extraction, Mask/Signal Triggers, Alarms etc. As depicted Fast Storage 520 and Processing 515 receive their inputs from Baseband Process Block 570 within RF Front End 510.

However, RF Front End 510 differs substantially in architecture from RF Front End 220 in FIG. 3. As depicted RF Inputs 500A are coupled externally to RF signal sources, e.g. external antennae, and internally within RF Front End 510 to RF Selector 530 wherein the received RF signal is routed according to frequency to Very Low RF Processing Block 550 or First Filter Bank 590. Signals routed to Very Low RF Processing Block 550 after processing are coupled directly to Baseband Processor Block 570 and thereafter to output ports 500B and 500C. The RF signals routed to First Filter Bank 590 are processed according to the frequency of the RF signal(s) before being routed to one of the RF processing blocks depicted as Low RF Processing Block 535, Mid RF Processing Block 540 and High RF Processing Block 545 for example. According to the design of the RF processing blocks, e.g. by providing output routing selector switches, then the output from a processing block may be fed back into one input of another processing block. For example, as depicted the output of High RF Processing Block 545 may be routed to Mid RF Processing Block 540 rather than directly to SP3T Switch 505. SP3T Switch 505 also receives the outputs from Low RF Processing Block 535 and High RF Processing Block 545 as well as Mid RF Processing Block 540. As such the selected output from these RF processing blocks is coupled to Amplified Filter Bank 595 via SP3T Switch 505. From Amplified Filter Bank 595 the processed amplified RF signal is coupled to Programmable Quadrature Demodulator Block 560 comprising first to fourth RF switches 585A to 585D disposed before and after each mixer allowing it to be selectively coupled in or out of the RF path. Each mixer being coupled to LO 580 which provides two RF signals, one with a 90° degree offset. Accordingly, with first to fourth RF switches 585A to 585D closed both mixers operate providing I and Q down converted signals to Baseband Processor Block 570. However, if one pair of switches, for example first and third switches 585A and 585C respectively or second and fourth switches 585B and 585D respectively, are open then only one arm down-converts. This down-converted RF signal is similarly coupled to Baseband Processor Block 570 and therein to output ports 500B and 500C respectively which are coupled to Processing 515 and Fast Storage 520 respectively.

Figure 6:
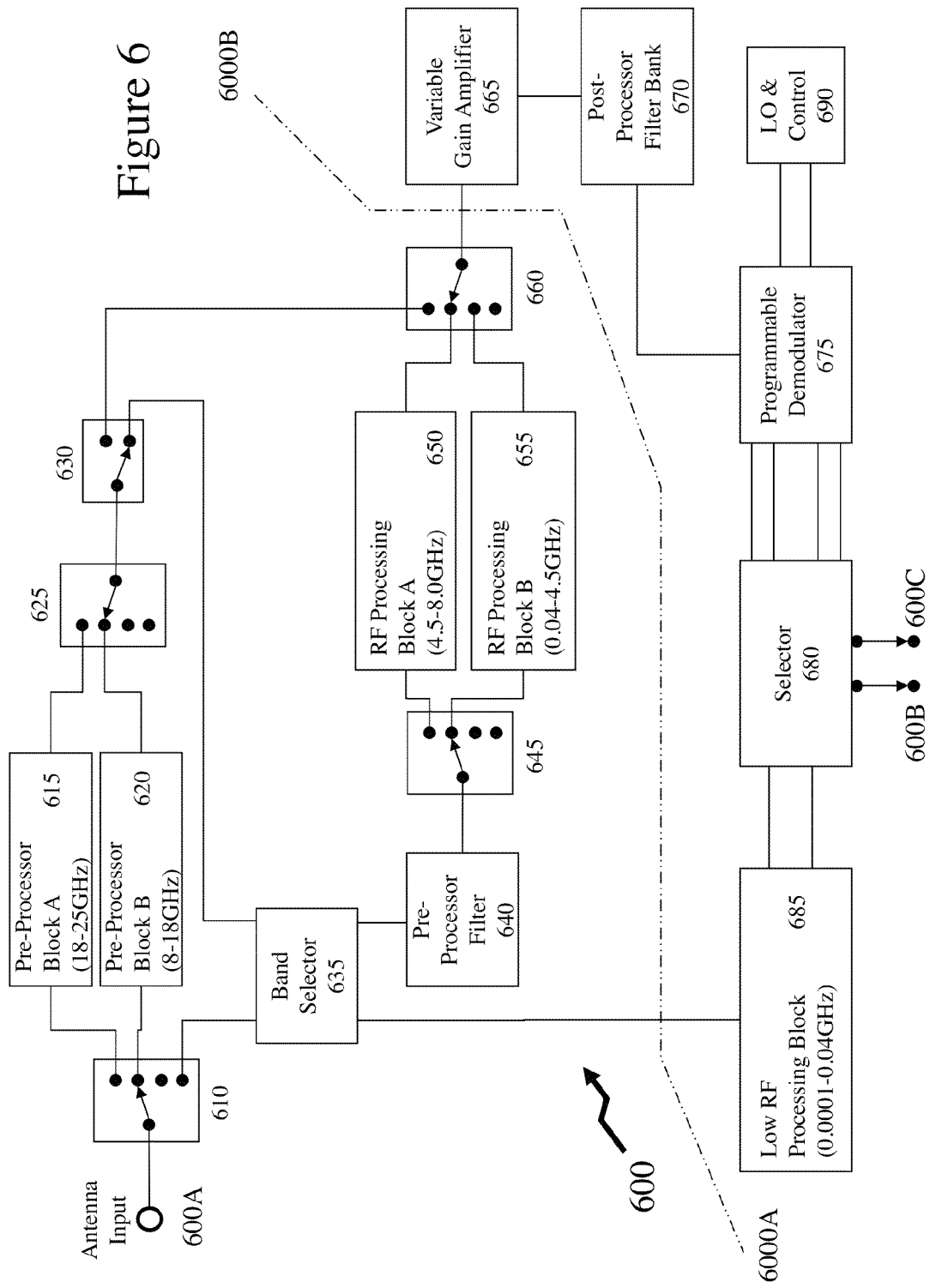
FIG. 6 depicts a RF front-end for a real time spectrum analyzer according to an embodiment of the invention.

Now referring to FIG. 6 there is depicted an exemplary architecture for a RF Front End 600 according to an embodiment of the invention operating 0.0001 GHz to 25 GHz. As depicted an antenna input 600A is coupled to first RF Router 610, depicted as a 1:N RF switch, which couples the received RF signal to Pre-Processor Block A 615 when it is within the frequency range 18-25 GHz, to Pre-Processor Block B 620 when within the range 8-18 GHz, and Band Selector 635 for frequencies below 8 GHz. The outputs of Pre-Processor Blocks A and B 615 and 620 are coupled to second RF Router 625 and thence third RF Router 630 wherein they are either coupled to Band Selector 635 or Fifth RF Router 660. Those RF signals coupled to the Band Selector 635 are routed to Low RF Processing Block 685 when their frequency or frequencies are within the range 0.0001 GHz-0.040 GHz (100 kHz-40 MHz) wherein they are processed and coupled to Selector 680 to provide signals to output ports 600B and 600C. It would be evident to one skilled in the art that within the RF processing portion of a RTSA, such as depicted by RF Front Ends 510 and 600 in FIGS. 5 and 6 respectively that there is design flexibility to process signals in the range 0.0001 GHz-0.040 GHz within another RF processing block, for example RF Processing Block B 655, by appropriate design of said RF Processing Block B or by adding an additional pre-processing circuit, for example Pre-Processor Block C (not shown for clarity as an option), thereby avoiding direct digitization of this range of frequencies.

Signals coupled to Band Selector 635 within the range 0.040 GHz-8.0 GHz (40 MHz-8.0 GHz) are routed to Pre-Processor Filter 640 before being coupled to fourth Router 645 wherein they are coupled to either RF Processing Block A 650 (for frequencies between 4.5 GHz and 8.0 GHz) or RF Processing Block B 655 (for frequencies between 0.040 GHz and 4.5 GHz). The outputs from RF Processing Blocks A and B 650 and 655 respectively are then coupled via fifth Router 660 to Variable Gain Amplifier 665 before being coupled to Post-Processor Filter Bank 670 and thereafter Programmable Demodulator 675. Also coupled to Programmable Demodulator 675 is LO & Control 690 which provides 0° and 90° phase-shifted Local Oscillator signals as well as control signals to determine whether Programmable Demodulator 675 will operate with both mixers and accordingly operate as I-Q DCR. The outputs of Programmable Demodulator 675 are coupled to Selector 680 and therein output ports 600B and 600C respectively.

It would be evident that first to fifth Routers 610, 625, 630, 645, and 660 as depicted are RF switches and accordingly would receive electrical control signals from an external controller, not shown for clarity, within the RTSA of which RF Front End 600 forms part. Similarly, control signals from the external controller may be provided to one or more other circuit blocks in dependence upon several factors, including for example, the status of the RF Front End 600, the frequency or frequencies being analysed, previously generated alarm signals, and previously generated trigger signals. These circuit blocks may be Pre-Processor Block A 615, Pre-Processor Block B 620, RF Processing Block A 650, RF Processing Block B 655, Band Selector 635, Pre-Processor Filter 640, Variable Gain Amplifier 665, Post-Processor Filter Bank 670, Programmable Demodulator 675, and LO & Control 690. Such signals may adjust aspects of these circuit blocks performance, e.g. gain, or control internal RF signal routing within these circuit blocks, see FIGS. 7 and 8 below for such adjustment. Similarly, control signals may be provided to LO & Control 690 to set the LO frequency and Programmable Demodulator 675 to SUPHET or DCR mode.

Figure 7:
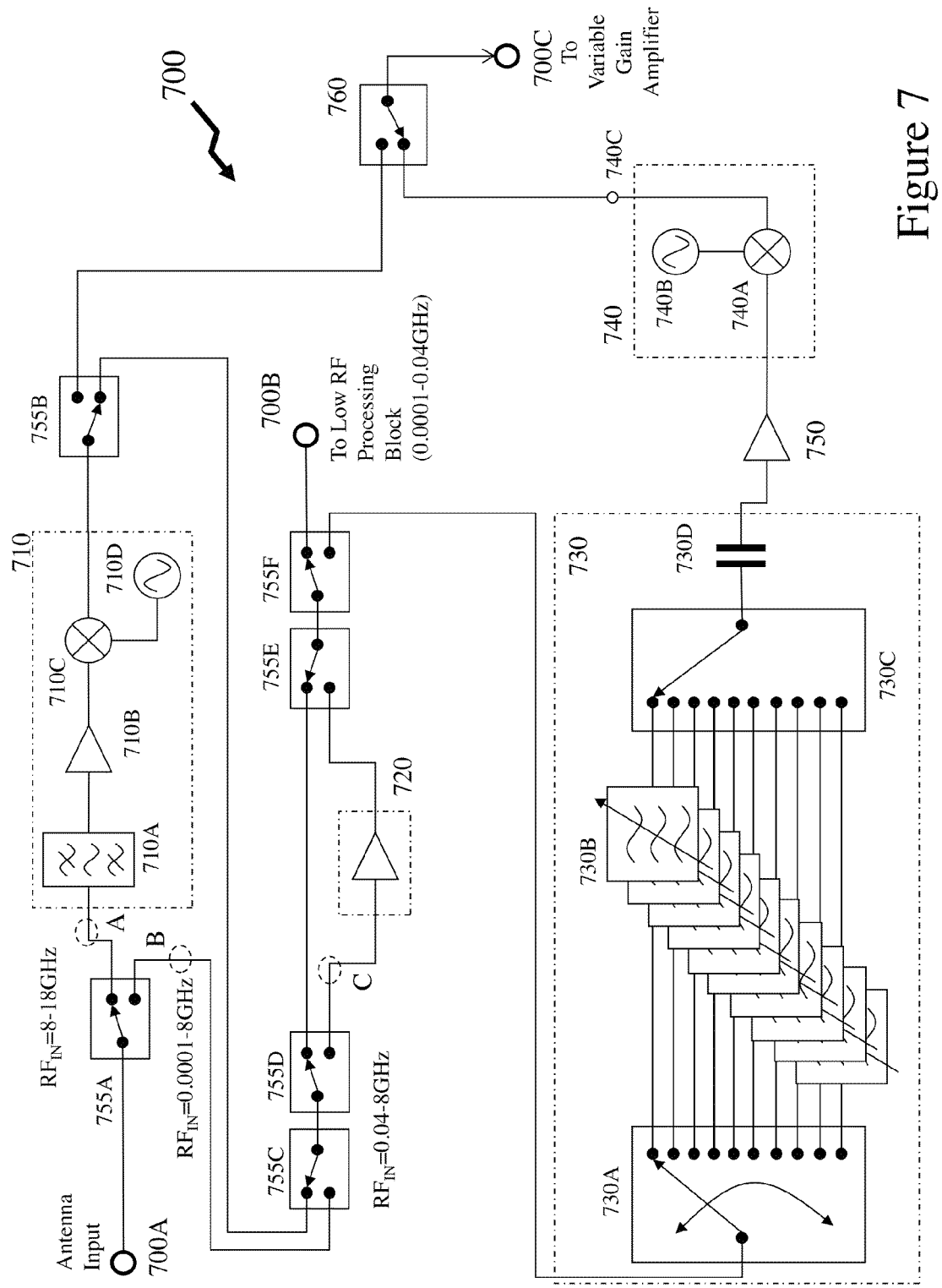
FIG. 7 depicts a first part of a RF front-end circuit for a real time spectrum analyzer according to an embodiment of the invention.
Figure 8:
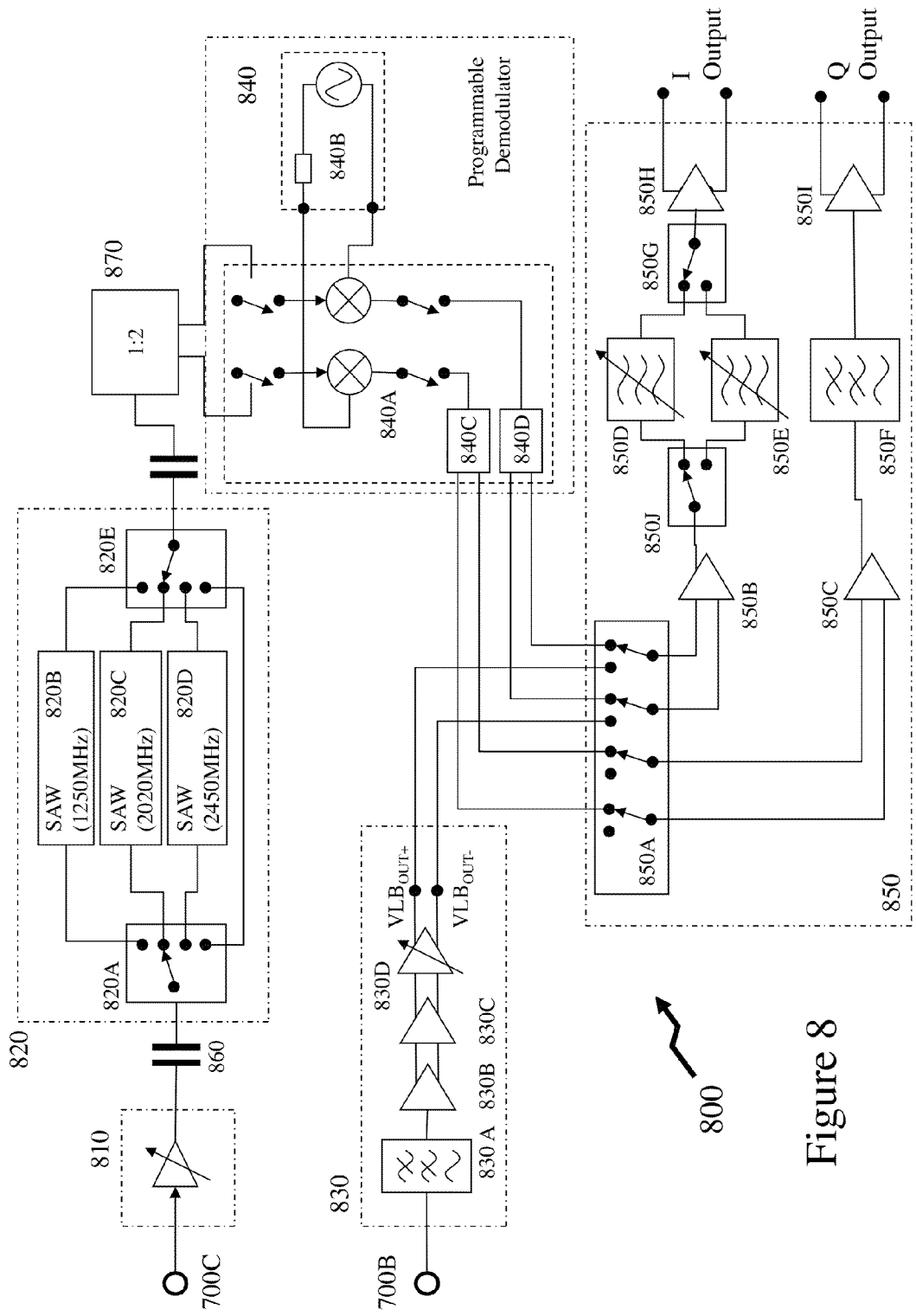
FIG. 8 depicts a second part of a RF front-end circuit for a real time spectrum analyzer according to an embodiment of the invention.

Also depicted in FIG. 6 is a demarcation line 6000A-6000B which denotes to upper left a first portion of RF Front End 600 which is depicted in FIG. 7 according to an embodiment of the invention with one potential circuit configuration targeted to operation over 0.0001 GHz-25 GHz. To the lower-right of demarcation line 6000A-6000B a second portion of RF Front End 600 is depicted in FIG. 8 according to an embodiment of the invention with one potential circuit configuration targeted to operation over 0.0001 GHz-25 GHz. It would be evident to one skilled in the art that other circuit implementations may be provided for the same operating frequency range with different sub-divisions of the band into multiple frequency bands and their processing discretely or in combination. It would be evident to one skilled in the art, and as depicted below in respect of FIG. 7 for example, that the order of functional blocks may in some embodiments of the invention be varied for all frequencies or for one or more predetermined frequency ranges only.

Referring to FIG. 7 there is depicted RF Front End Section 700 according to an embodiment of the invention with one potential circuit configuration targeted to operation over 0.0001 GHz-25 GHz and representing the upper left portion of the RF Front End 600 in FIG. 6 as denoted by the demarcation line 6000A-6000B. Accordingly, RF signals to be processed/analysed are received at Antenna Input 700A. These signals are coupled to first RF Router 755A, depicted as a 1:2 RF switch and equivalent to first Router 610 in FIG. 6, which couples the received RF signal to Pre-Processor Block 710 when it is within the frequency range 8-18 GHz, point A, and to third and fourth RF Switches 755C and 755D respectively when it is within 0.0001-8 GHz or as determined under control of the RTSA within which the RF Front End Section 700 forms part, point B. Third and fourth RF switches 755C and 755D respectively being equivalent to Band Selector 635 in FIG. 6. As depicted Pre-Processor Block 710 comprises first filter 710A, first amplifier 710B, and first mixer 710C coupled to first LO 710D such that it down-converts signals within the range 8-18 GHz to a lower frequency range determined by the frequency of first LO 710D. Accordingly, first LO 710 may be a single oscillator operating to down-convert the full band or it may be a programmable oscillator/multiple oscillators to down-convert the band in two or more sub-bands.

The output of Pre-Processor Block 710 is coupled to second RF Switch 755B and thence to either third RF Switch 755C or seventh RF Switch 760. Those RF signals coupled to the third and fourth RF Switches 755C and 755B respectively within the frequency range 0.0001-0.04 GHz are routed via bypass to fifth and sixth RF Switches 755E and 755F to port 700B and thence Low RF Processing Block 830 depicted in FIG. 8 as described below. When the frequencies lie within the range 0.04-8.0 GHz as received at fourth RF Switch 755D these may be routed through the bypass to fifth RF Switch 755E or via first RF Amplifier 720, depicted as a single gain stage, point C, to fifth RF Switch 755E. RF signals above 40 MHz are coupled to Processor Bank 730 before being coupled to RF Amplifier 750 and RF-IF Selector 740. RF-IF Selector 740 as depicted comprises RF-IF mixer 740A and RF-IF LO 740B wherein the output from RF-IF Selector 740 is coupled to seventh RF Switch 760. It would be evident to one skilled in the art that RF-IF Mixer 740E may be replaced by two or more mixers in the event that the RF and IF frequency coverage of a single mixer is unable to satisfy the processing requirements for the block, i.e. 0.04-8 GHz.

Processor Bank 730 as depicted comprises an array of filters 730B disposed between first and second RF Filter Routers 730A and 730B respectively. The output of second RF Filter Router 730B is coupled via DC block 730D to second RF Amplifier 750 and RF-IF Selector 740. Each filter 730B within the array of filters 730B may be a fixed filter or a tunable filter according to the overall design of the RF Front End Section 700. A tunable filter may be tuned, for example, under electrical control to adjust its center frequency and/or bandwidth. According to an embodiment of the invention, filters within the array of filters 730B may be designed to provide filtering profiles at 0.004-4.5 GHz, 4.5-8.0 GHz, 0.004-1.8 GHz, 1.80-2.75 GHz, and 2.75-4.50 GHz, for example. Optionally, an unfiltered signal path may also be provided within Processer Bank 730.

Referring to FIG. 8 there is depicted RF Front End Section 800 according to an embodiment of the invention with one potential circuit configuration targeted to operation over 0.0001 GHz-25 GHz and representing the lower right portion of the RF Front End 600 in FIG. 6 as denoted by the demarcation line 6000A-6000B. As depicted Variable Gain Amplifier 810, equivalent to Variable Gain Amplifier 665 in FIG. 6, receives the signals from seventh RF Switch 760 at port 700C and its output is coupled to Post-Processor Filter Bank 820, equivalent to Post-Processor Filter Bank 670 in FIG. 6, via first DC block 860. Post-Processor Filter Bank 820 as depicted comprises first and second RF Routing Elements 820A and 820E between which are disposed first to third SAW Filters 820B through 820D respectively. The output of Post-Processor Filter Bank 820 is coupled via second DC block 865 to Coupler 870 which generates two equal RF signals for coupling to Programmable Demodulator 840. Programmable Demodulator 840 comprises LO Circuit 840B and Mixer-Switch Circuit 840A, having a configuration similar to Programmable Demodulator Block 560 in FIG. 5 allowing selective configuration between SUPHET and DCR operating modes and generating output signal(s) to 1:2 Transformers 840C and 840D which are coupled to Switching Bank 850A in Selector 850, equivalent to Selector 680 in FIG. 6.

Selector 850 also receives coupled to other ports of Switching Bank 850A the outputs $VLB_{OUT+}$ and $VLB_{OUT-}$ from Very Low RF Processing Block 830 coupled to port 700B in FIG. 7. Very Low RF Processing Block 830 comprises Low RF Filter 830A, dual amplifier cascade 830B and 830C together with dual differential output amplifier 830D which generates $VLB_{OUT+}$ and $VLB_{OUT-}$. As depicted a first pair of outputs from Switching Bank 850A is coupled to I Amplifier 850B and a second pair of outputs from Switching Bank 850A is coupled to Q Amplifier 850C. Accordingly, as depicted the first pair of outputs are switchably coupled to either a first predetermined portion of the outputs of Programmable Demodulator 840 or Very Low RF Processing Block 830. The second pair of outlets is switchably coupled to open circuit or a second predetermined portion of the outputs of Programmable Demodulator 840.

I Amplifier 850B is a dual differential output amplifier with Bandpass Filter A 850D and first Low Pass Filter 850E selectively coupled between the output of I Amplifier 850B and first dual output amplifier 850H by Selector Switch 850J and first Output Switch 850G. Accordingly, the filtered output from the I Amplifier 850B is amplified by first dual output amplifier 850H to generate I output signals. Q Amplifier 850C is dual differential output amplifier with a single output coupled to second Low Pass Filter 850F, the output of which is amplified by second dual output amplifier 850I to generate Q output signals. As depicted Selector Switch 850J and first Output Switch 850G are depicted as tunable filter devices whilst second Low Pass Filter 850F is depicted as fixed. It would be evident to one skilled in the art that various combinations of tunable and fixed filter components may be provided for each of the Bandpass Filter A 850D, first Low Pass Filter 850E, and second Low Pass Filter 850F. A tunable filter may, for example, be electrically tunable over centre frequency and/or bandwidth.

First Filter Bank 590, depicted as Pre-Processor Filter 640 as well as filter blocks within Pre-Processor Block A 615, Pre-Processor Block B 620, and Low RF Processing Block 685 in FIG. 6 and first filter 710A, Processor Bank 730 in FIG. 7 and Low RF Filter 830A in FIG. 8 provide image rejection and are employed to reject input signals which would otherwise result in either receiver saturation and/or spurious mixing products within the Programmable Demodulator 560, and as depicted as Programmable Demodulators 675 and 840 in FIGS. 6 and 8 respectively. Amplified Filter Bank 595, depicted as Post-Processor Filter Bank 670 in FIG. 6 and Post-Processor Filter Bank 820 in FIG. 8 provides rejection of frequency spurs as well as in-band RF signals. For instance, if the RF Front End 510 is tuned to receive RF signals within 2400 MHz-2500 MHz then the RF signals are passed via first SAW Filter 820B having center frequency of 1250 MHz. Accordingly, first Filter Bank 590 (Pre-Processor filter 640) provides for image and harmonic rejection. Amplified Filter Bank 595 (Post-Processor Filter Bank 670) and the anti-aliasing first Low Pass Filter 850E provide the rejection that is equivalent to a bandpass filter at baseband.

Within Baseband Processor Block 570, as depicted by Selector 680 in FIG. 6 and Selector 850 in FIG. 8, a bandpass filter has been added, e.g. anti-aliasing Bandpass Filter 850D in FIG. 8, although a low pass filter may instead be employed for the SUPHET path. The DCR path exploits low pass filters on both I and Q channels, e.g. first Low Pass Filter 850E and second Low Pass Filter 850F respectively. Accordingly, through use of filters in Post-Processor Filter Bank 820 and Selector 850 (e.g. anti-aliasing filter) in conjunction with down-conversion and programmable SUPHET/DCR conversion provide for RF signal receivers capable of providing effectively the required bandpass filter effect. Accordingly, an embodiment of the invention may provide for processing 50 MHz bandwidth signals centered at 25 MHz center frequency.

Figure 9:
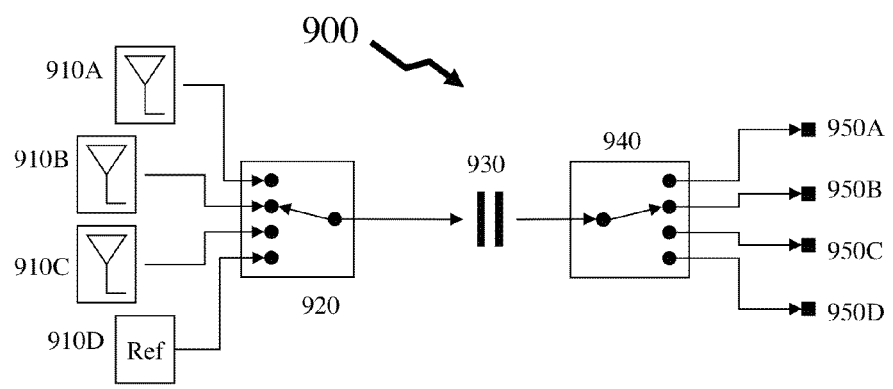
FIG. 9 depicts an antenna selector-RF circuit path processing circuit according to an embodiment of the invention.

Referring to FIG. 9 there is depicted a RF antenna and RF front-end processing selector circuit 900 according to an embodiment of the invention, such as depicted by RF Selector circuit 410 in FIG. 4 or Antenna Input 600A and first Router 610 FIG. 6. Accordingly, first to third antennas 910A to 910C respectively are depicted coupled to a 4:1 switch 920 along with Reference 910D. Reference 910D in this embodiment being a test port through which a calibration signal may be applied to the RF Front End Circuit and processed by the RTSA allowing calibration of the RTSA and/or periodic verification. First to third antennae 910A through 910C may provide coverage of the full 0.0001 GHz to 25 GHz frequency range of an RTSA within which the RF antennae and 4:1 switch 920 are operating or provide different bands according to the deployment scenario of the RTSA. The output of 4:1 switch 920 is coupled via DC block 930 to 1:4 switch 940 having first to fourth outputs 950A through 950D respectively. Accordingly, it would be evident to one skilled in the art that multiple antennae may be employed in conjunction with multiple pre-processing circuits as well as multiple RF processing circuits and band selector circuits.

It would be evident to one skilled in the art that the RF circuits depicted within FIGS. 6 through 8 in respect of that embodiment of the invention may be varied without departing from the scope of the invention. For example, first LO 710D within Pre-Processor Block 710 may be replaced with LO Circuit 420 as described in respect of FIG. 4 and by the inventors in US Patent Application 2013/0,064,328 entitled "Radio Frequency Receiver System for Wideband Signal Processing" the entire contents of which are incorporated herein by reference. Optionally, first LO 710D may be external to Pre-Processor Block 710 and implemented as depicted by LO Circuit 420 or other local oscillator circuits. Such "external" local oscillator circuit may then be coupled to Pre-Processor Block 710 and a second output of the local oscillator circuit coupled to a second Pre-Processor Block, not depicted in FIG. 7.

As depicted in FIG. 6 Pre-Processor Blocks A and B 615 and 620 respectively are employed although in FIG. 7 only a single Pre-Processor Block 710 is depicted. It would be evident to one skilled in the art that other RF circuits may be provided to perform the desired pre-processing to the input RF signal such as depicted supra in respect of High RF Circuit 430 and Low RF Circuit 440 comprising cascaded amplifiers, switchable filtering, and mixing etc. and as described by the inventors in US Patent Application 2013/0,064,328 entitled "Radio Frequency Receiver System for Wideband Signal Processing" the entire contents of which are incorporated herein by reference. Based upon the local oscillator circuit and RF signals coupled to each circuit these may perform down-conversion, such as presented supra in respect of High RF Circuit 430 in FIG. 4, or up-conversion, such as presented supra in respect of Low RF Circuit 440 in FIG. 4. Optionally, Low RF Circuit 440 may be employed for down-conversion or High RF Circuit 440 for up-conversion based upon design requirements of RTSA etc. It would be evident that other RF circuit designs may be implemented to provide the required functionality and performance without departing from the scope of the invention.

As depicted in FIG. 6 after Band Selector 635 RF signals within the range 40 MHz-8 GHz are coupled to Pre-Processor Filter 640 after which the RF signal is routed to either RF Processing Block A 650 or RF Processing Block B 655 before being coupled to Variable Gain Amplifier 665. As depicted in FIG. 7 Band Selector 635 is implemented using fourth to sixth RF Switches 775C through 775F respectively in conjunction with bypass path and first RF Amplifier 720. Optionally, these two RF circuit paths may be expanded to include multiple RF circuit paths banded in frequency to match with one or more RTSA processing blocks including, for example, Pre-Processor Filter 640/Processor Bank 730 and RF Processing Blocks.

As depicted in FIG. 6 RF Processing Blocks A and B 650 and 655 are disposed between fourth Router 645 and fifth Router 660 after Pre-Processor Filter 640. However, in FIG. 7 it would be evident to one skilled in the art that only second RF Amplifier 750 and RF-IF Selector 740 are disposed between sixth RF Switch 755F and seventh RF switch 760 implementing essentially a single RF Processing Block rather than the pair of RF Processing Blocks A and B 650 and 655 respectively. Accordingly it would be evident that second RF Amplifier 750 and RF-IF Selector 740 may be augmented and/or replaced with other RF Processing Blocks including for example, but not limited, to High RF Circuit 430, Medium RF Circuit 450, Low RF Circuit 440 as depicted in FIG. 4 and as described by the inventors in US Patent Application 2013/0,064,328 entitled "Radio Frequency Receiver System for Wideband Signal Processing" the entire contents of which are incorporated herein by reference. Optionally, other RF circuits may be provided including for example a parallel array of amplifiers wherein each amplifier is matched to one or more frequency bands as established by the design of the Pre-Processor Filter 640/Processor Bank 730.

Figure 10:
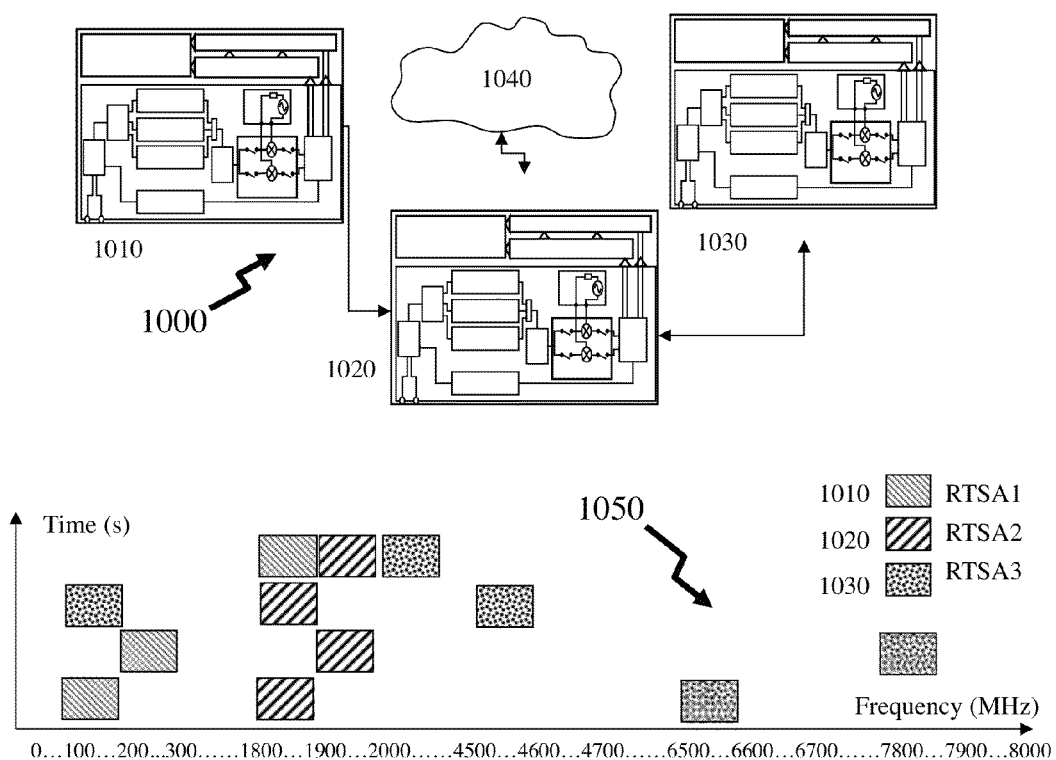
FIG. 10 depicts schematically the operation of associated real time spectrum analyzers according to an embodiment of the invention providing spectral mapping across multiple bands.

Now referring to FIG. 10 there is depicted a RTSA array 1000 incorporating first to third RTSAs 1010 to 1030 respectively. First and third RTSAs 1010 and 1030 are interfaced to second RTSA 1020, which is connected to a network 1040, and to the network 1040. Second RTSA 1020 provides the clock to first and third RTSAs 1010 and 1030 therefore synchronizing these devices to the second RTSA 1020. The scan list of up to 1024 center frequencies in each of the first to third RTSAs 1010 to 1030 may be provided to each RTSA individually via network 1040 or coordinated through second RTSA 1020. Likewise the events/triggers/data which are communicated to the remote control system, not shown for clarity, may be communicated directly from each of the RTSAs or coordinated through second RTSA 1020.

Accordingly as shown in spectrum 1050 the three RTSAs step according to the predetermined center frequency list such that first RTSA 1010 for example steps from 150 MHz, 250 MHz, 4550 MHz, and 1850 MHz; second RTSA 1020 steps from 1850 MHz, 1950 MHz, 1850 MHz, and 1950 MHz; and third RTSA 1030 steps from 6550 MHz, 7850 MHz, 150 MHz, and 2050 MHz. Each RTSA in stepping from one frequency to another configures the associated RF antenna and RF front-end processing selector circuit, such as first Router 610, Band Selector 635, Pre-Processing Filter 640, and Post-Processor Filter Bank 670 as depicted in FIG. 6 for example, which determines the RF circuit path within the RTSA. Additionally, the internally settings of the RTSA for the RF processing elements may be dynamically adjusted in dependence upon the center frequency of the RTSA according to the parameter configurations stored within the internal memory of the RTSA. For example, the settings of some circuit elements in Pre-Processor Block A 615 or RF Processing Block A 650 as depicted in FIG. 6 may be adjusted if the center frequency lies within 23 GHz-25 GHz as opposed to 18 GHz-21 GHz so that Pre-Processor Block A 615 offers improved performance and has correct LO whilst RF Processing Block A 650 is configured on the basis that the down-converted RF signals from Pre-Process Block A 615 are within 4.5 GHz-7.5 GHz (down converted from 18 GHz-21 GHz) as opposed to 6 GHz-8 GHz (down converted from 23 GHz-25 GHz). Likewise the characteristics of the filters, multiplexers, operational amplifiers, low noise amplifiers, etc. may be adjusted in response to the center frequency setting of the RTSA or other factors determined by the RTSA locally or from a remote controller. Similarly, one or more filters within a switchable filter array such as Processor Bank 730 may be replaced by a fast variable filter with adjustable center frequency and band-pass characteristics, such as those employing comb lines for example.

Within the embodiments of the invention described above Processor Bank 730 has been described as comprising first to fourth filters 730C to 730E and 7301 respectively which provide high frequency cut-off, i.e. they are low pass filters, with high shape factor. Accordingly first to fourth filters 730C to 730E and 7301 may for example be high order Butterworth filters or high order Chebyschev filters which may be implemented with passive elements, e.g. resistors and capacitors, or active circuit elements such as operational amplifiers. Similarly, Post-Processor Filter Bank 820 has been described supra in respect of being implemented using SAW filters on the basis of providing low frequency cut-off, i.e. bandpass or high pass. It would be evident that other band-pass or high pass filters may be employed according to the desired performance of the RTSA. Examples of such alternate technologies include, but are not limited to, microelectromechanical (MEM) filters, passive linear electrical networks with resistors, inductors, and capacitors, semi-lumped mechanical filters, and bridged mechanical filters.

Within the embodiments of the invention described in respect of FIGS. 5 through 10 through the elements of any embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc. that is implemented or embodied in a hardware structure (e.g., flash memory, ROM, EROM). Examples of firmware may include microcode, writable control store, micro-programmed structure.

When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information.

Examples of the processor readable or machine accessible medium include but are not limited to an electronic circuit, a semiconductor memory device, a read only memory (ROM), a flash memory, an erasable ROM (EROM), a floppy diskette, a compact disk (CD) ROM, an optical disk, and a hard disk. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

Any hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

When an embodiment of the invention may be described as a process it is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

When the methodologies described herein are, in one or more embodiments, performable by a machine such a machine may include one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The term memory as used herein refers to any non-transitory tangible computer storage medium. The memory includes machine-readable code segments (e.g. software) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The term "machine" may also be taken to include any collection of machines that individually or jointly execute a set (or multiple sets) of instructions to perform any one or more of the methodologies discussed herein.

When an embodiment of the invention may be described in terms of an electronic circuit, such electronic circuit generally refers to an element having a physical structure such as a semiconductor device, an integrated circuit, a hybrid circuit, an analog circuit, a digital circuit, and a mixed signal circuit but it may refer to a replacement of a physical circuit with processing performed using digital signal processing controlled through one or more microprocessors. Such electronic circuit may be implemented in one or more semiconductor technologies, including for example silicon, germanium, silicon germanium, indium phosphide and gallium arsenide.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A device comprising:
a first filter characterised by a first frequency characteristic;
a second filter characterised by a second frequency characteristic;
an RF processing circuit for receiving RF signals within a frequency range compatible with the first and second frequency characteristics and processing said received RF signals to generate a processed RF output signal;
a programmable quadrature demodulator block coupled to the RF processing circuit comprising a first mixer receiving a local oscillator signal, a second mixer receiving the local oscillator signal with a predetermined phase offset, the programmable quadrature demodulator block operating in a first mode and a second mode wherein the first mode comprises coupling the processed RF output signal to both first and second mixers and generating first and second outputs representing in-phase and quadrature components of the processed RF output signal; and the second mode comprises coupling the processed RF output signal to only the first mixer, generating a down converted signal in dependence upon the processed RF signal and the local oscillator signal, and selectively blocking output from the second mixer.

2. The device according to claim 1 wherein, the first filter is at least one of a low pass filter, high pass filter, and a bandpass, the at least one of selected in dependence upon a range of RF frequencies to be rejected by the first filter;

the second filter is at least one of a band pass filter, a low pass filter and a high pass filter.

3. The device according to claim 1 wherein, at least of the first frequency characteristic and the second frequency characteristic are established in dependence upon a predetermined frequency range, said predetermined frequency range defining the frequency range compatible with the first and second frequency characteristics.

4. The device according to claim 1 wherein, at least of the first frequency characteristic and the second frequency characteristic are established in dependence upon a predetermined frequency range, wherein the at least one of results in at least one of:

rejecting RF signals with frequencies that would result in undesired signals at the output of the programmable quadrature demodulator block when operating in the first mode; and rejecting RF signals with at least one of frequencies and image frequencies that would result in undesired signals at the output of the programmable quadrature demodulator block when operating in the second mode.

5. The device according to claim 4 wherein, the first filter is a SAW filter bank comprising at least two SAW filters of a plurality of SAW filters, the first filter allowing the frequency range of the processed RF output signal to be switched between at least a first intermediate frequency range and a second intermediate frequency range such that an undesired signal maybe removed by changing the undesired signal to one of a sum and a difference between the received RF signals and a local oscillator signal within the RF processing circuit.

6. The device according to claim 1 wherein, the first filter is a SAW filter and the second filter is an anti-aliasing filter such that the device may reject out of band signals at baseband whilst maximizing processed RF signal bandwidth.

7. The device according to claim 6 wherein, the programmable quadrature demodulator block when operating in the second mode may be reconfigured to replace a low pass filter within the programmable quadrature demodulator block with a band pass filter.

8. The device according to claim 1 wherein, the first filter is a filter exploiting at least one of passive electrical elements and active electrical elements; and the second filter is a SAW filter.

9. The device according to claim 1, wherein the output from the device passes through three filters including the first filter and the second filter such that no direct path from the input of RF processing circuit to the output of the programmable quadrature demodulator block exists.

10. The device according to claim 9, wherein the three filters each respectively form part of a front-end pre-select filter bank, a SAW filter bank, and an anti-aliasing filter bank.

11. The device according to claim 1 further comprising;

a plurality of first filters of which the first filter is one and the first frequency characteristic is the 3dB cut-off frequency of the first filter;

a plurality of second filters of which the second filter is one and the second frequency characteristic is the 3dB cut-off frequency of the second filter; and a switching circuit to selectively couple the received RF signal to a predetermined first filter of the plurality of first filters, to couple the output of the first filter of the plurality of first filters to the RF processing circuit, to couple the output of the RF processing circuit to a predetermined second filter of the plurality of second filters, and from the predetermined second filter of the plurality of second filters to the programmable quadrature demodulator block.

12. A method comprising;

processing a received RF signal using an electronic circuit to generate an output signal, the output signal being generated via an RF processing circuit and a programmable quadrature demodulator block operable in a first mode and a second mode, wherein the RF processing circuit processes the received RF signals to generate a processed RF output signal and comprises:

a plurality of first filters, each first filter being at least one of a low pass filter, high pass filter, and a bandpass filter and characterized by at least a predetermined 3dB cut-off frequency;

a plurality of second filters, each second filter being a characterized by a predetermined 3dB cut-off frequency; and a switching circuit to selectively couple the received RF signal to a predetermined first filter of the plurality of first filters and then a predetermined second filter of the plurality of second filters prior to the received RF signal is coupled to portion of the electronic circuit comprising the pair of mixers; and the programmable quadrature demodulator block comprises a pair of mixers each receiving a local oscillator signal with a predetermined phase offset between the local oscillator signals applied to the pair of mixers, wherein in the first mode of the programmable quadrature demodulator block comprises coupling the processed RF output signal to both mixers and generating first and second outputs representing in-phase and quadrature components of the processed RF output signal respectively; and in the second mode of the programmable quadrature demodulator block comprises coupling the processed RF output signal to only one mixer of the pair of mixers, generating a down converted signal in dependence upon the processed RF output signal and the local oscillator signal, and selectively blocking output from the other mixer of the pair of mixers.

13. The method according to claim 12 wherein, re-configuring the electronic circuit from the second mode to the first mode comprises the steps of selecting the appropriate front-end filter, establishing a local oscillator at a first frequency and decoupling a first mixer of a pair of mixers from the output of the electronic circuit, and determining whether to reconfigure a SAW filter bank to select a different SAW filter than the SAW filter employed in the second mode; and re-configuring the electronic circuit from the first mode to the second mode comprises the steps of establishing the local oscillator at a second frequency, re-coupling the first mixer of the pair of mixers to the output of the electronic circuit, and selecting an appropriate anti-aliasing filter.

14. The method according to claim 12 wherein;
each first filter of the plurality of first filters is at least one of a low pass filter, high pass filter, and a bandpass filter exploiting at least one of passive electrical elements and active electrical elements; and
each second filter of the plurality of second filters is a SAW filter.

15. The method according to claim 12 wherein,
the electronic circuit comprises an RF processing circuit of a plurality of processing circuits, each RF processing circuit for processing received RF signals within a predetermined frequency range to generate a processed RF output signal; and
the switching circuit further selectively couples the RF processing circuit of the plurality of processing circuits between the predetermined first filter of the plurality of first filters and the predetermined second filter of the plurality of second filters prior coupling the processed and filtered received RF signal to that portion of the electronic circuit comprising the pair of mixers.

16. The method according to claim 12 wherein,
at least of the first frequency characteristic and the second frequency characteristic are establish a predetermined frequency range, said predetermined frequency range defining the frequency range compatible with the first and second frequency characteristics.

17. The device according to claim 12 wherein,
at least of the first frequency characteristic and the second frequency characteristic are established in dependence upon a predetermined frequency range, wherein the at least one of results in at least one of:
rejecting RF signals with frequencies that would result in undesired signals at the output of a programmable quadrature demodulator block when operating in the first mode; and
rejecting RF signals with at least one of frequencies and image frequencies that would result in undesired at the output of a programmable quadrature demodulator block when operating in the second mode.

18. The device according to claim 17 wherein,
the first filter is a SAW filter bank comprising at least two SAW filters of a plurality of SAW filters, the first filter allowing the frequency range of the processed RF output signal to be switched between at least a first intermediate frequency range and a second intermediate frequency range such that an undesired signal maybe removed by changing the undesired signal to one of a sum and a difference between the received RF signals and a local oscillator signal within the RF processing circuit.

19. The device according to claim 12 wherein,
the first filter is a SAW filter and the second filter is an anti-aliasing filter such that the device may reject out of band signals at baseband whilst maximizing processed RF signal bandwidth.

20. The device according to claim 19 wherein,
a programmable quadrature demodulator block comprising a predetermined portion of the electronic circuit when operating in the second mode may be reconfigured to replace a low pass filter within the programmable quadrature demodulator block with a band pass filter.

21. A device comprising:
a single RF receiver block supporting operation in a first mode and a second mode comprising at least a programmable quadrature demodulator block operable in the first mode and the second mode for receiving an RF signal and generating an output signal, the programmable quadrature demodulator block comprising a first mixer receiving a local oscillator signal and a second mixer receiving the local oscillator signal with a predetermined phase offset; wherein
in the first mode the programmable quadrature demodulator block couples the RF signal to both first and second mixers and generates first and second outputs representing in-phase and quadrature components of the RF signal; and
in the second mode the programmable quadrature demodulator block couples the RF signal to only the first mixer and generates a down converted output signal.

22. A method comprising;
processing a RF signal using an electronic circuit to generate an output signal, the output signal generated via a programmable quadrature demodulator block operable in a first mode and a second mode, the programmable quadrature demodulator block comprising a pair of mixers each receiving a local oscillator signal with a predetermined phase offset between the local oscillator signals applied to the pair of mixers, wherein
the first mode of the programmable quadrature demodulator block comprises coupling the RF signal to both mixers and generating first and second outputs representing in-phase and quadrature components of the RF signal respectively;
the second mode of the programmable quadrature demodulator block comprises coupling the RF signal to only one mixer of the pair of mixers and generating a down converted signal in dependence upon the RF signal and the local oscillator signal, and selectively blocking output from the other mixer of the pair of mixers;
re-configuring the electronic circuit from the second mode to the first mode comprises the steps of selecting an appropriate front-end filter, establishing the local oscillator at a first frequency and decoupling the first mixer of the pair of mixers from the output of the electronic circuit, and determining whether to reconfigure a SAW filter bank to select a different SAW filter than the SAW filter employed in the second mode; and
re-configuring the electronic circuit from the first mode to the second mode comprises the steps of establishing the local oscillator at a second frequency, re-coupling the first mixer of the pair of mixers to the output of the electronic circuit, and selecting an appropriate anti-aliasing filter.

23. A method comprising:
processing a received RF signal using an electronic circuit to generate an output signal, the output signal being generated-via an RF processing circuit and a programmable quadrature demodulator block operable in a first mode and a second mode, wherein
the RF processing circuit processes the received RF signals to generate a processed RF output signal by coupling the received RF signal through a first filter of a plurality of first filters and second filter of a plurality of second filters, each first filter of the plurality of first filters is at least one of a low pass filter, a high pass filter, and a bandpass filter exploiting at least one of passive electrical elements and active electrical elements;

each second filter of the plurality of second filters is a SAW filter; and the programmable quadrature demodulator block comprises a pair of mixers each receiving a local oscillator signal with a predetermined phase offset between the local oscillator signals applied to the pair of mixers, wherein in the first mode of the programmable quadrature demodulator block comprises coupling the processed RF output signal to both mixers and generating first and second outputs representing in-phase and quadrature components of the processed RF output signal respectively; and in the second mode of the programmable quadrature demodulator block comprises coupling the processed RF output signal to only one mixer of the pair of mixers, generating a down converted signal in dependence upon the processed RF output signal and the local oscillator signal, and selectively blocking output from the other mixer of the pair of mixers.

* * * * *